US012732640B2

(12) United States Patent
Tsai et al.

(10) Patent No.: US 12,732,640 B2
(45) Date of Patent: Sep. 8, 2026

(54) METHOD AND APPARATUS OF INHERITING CROSS-COMPONENT MODEL PARAMETERS IN VIDEO CODING SYSTEM

(71) Applicant: MEDIATEK INC., Hsinchu City (TW)

(72) Inventors: Chia-Ming Tsai, Hsinchu City (TW); Chih-Wei Hsu, Hsinchu City (TW); Yi-Wen Chen, San Jose, CA (US); Ching-Yeh Chen, Hsinchu City (TW); Tzu-Der Chuang, Hsinchu City (TW); Cheng-Yen Chuang, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 0 days.

(21) Appl. No.: 19/117,247

(22) PCT Filed: Oct. 7, 2023

(86) PCT No.: PCT/CN2023/123199

§ 371 (c)(1),
(2) Date: Mar. 31, 2025

(87) PCT Pub. No.: WO2024/074131

PCT Pub. Date: Apr. 11, 2024

(65) Prior Publication Data

US 2026/0107020 A1 Apr. 16, 2026

Related U.S. Application Data

(60) Provisional application No. 63/380,762, filed on Oct. 25, 2022, provisional application No. 63/378,707, filed on Oct. 7, 2022.

(51) Int. Cl.
*H04N 19/00* (2014.01)
*H04N 19/105* (2014.01)
(Continued)

(52) U.S. Cl.
CPC ........... *H04N 19/70* (2014.11); *H04N 19/105* (2014.11); *H04N 19/176* (2014.11); *H04N 19/186* (2014.11); *H04N 19/593* (2014.11)

(58) Field of Classification Search
CPC .... H04N 19/70; H04N 19/105; H04N 19/176; H04N 19/186; H04N 19/593
See application file for complete search history.

(56) References Cited

U.S. PATENT DOCUMENTS 10,708,591 B2 * 7/2020 Zhang .................... H04N 19/96
11,172,216 B1 * 11/2021 Zhang .................... H04N 19/46
(Continued)

FOREIGN PATENT DOCUMENTS

WO 2018183533 A1 10/2018
WO 2020096877 A1 5/2020

OTHER PUBLICATIONS

International Search Report and Written Opinion dated Dec. 19, 2023, issued in application No. PCT/CN2023/123199.

*Primary Examiner* — Frank F Huang
(74) *Attorney, Agent, or Firm* — McClure, Qualey & Rodack, LLP

(57) ABSTRACT

Methods and apparatus for inheriting model parameters for cross-component prediction modes. According to one method, a target model parameter set associated with a target inherited prediction model is derived based on an inherited model parameter set associated with the target inherited prediction model selected from the prediction candidate list, where the target model parameter set comprises at least one re-derived or refined parameter being re-derived or refined from the inherited model parameter set, and wherein said at least one re-derived or refined parameter comprises a CCLM offset parameter when the target inherited prediction model corresponds to CCLM (Cross Component Linear Model), or two separate inherited model parameter sets are used for a
(Continued)

second-colour block. At least one second-colour block is encoded or decoded using prediction data comprising cross-colour prediction generated by applying the target inherited prediction model with the target model parameter set to reconstructed first-colour block.

10 Claims, 10 Drawing Sheets

(51) Int. Cl.

| | |
|---|---|
| ***H04N 19/176*** | (2014.01) |
| ***H04N 19/186*** | (2014.01) |
| ***H04N 19/593*** | (2014.01) |
| ***H04N 19/70*** | (2014.01) |

(56) References Cited

U.S. PATENT DOCUMENTS

| | | | | |
|---|---|---|---|---|
| 11,546,592 | B2 * | 1/2023 | Zhao | H04N 19/119 |
| 11,910,020 | B2 * | 2/2024 | Zhang | H04N 19/80 |
| 12,101,472 | B2 * | 9/2024 | Racape | H04N 19/119 |
| 12,108,090 | B2 * | 10/2024 | Zhang | H04N 19/119 |
| 12,143,616 | B2 * | 11/2024 | Zhang | H04N 19/176 |
| 12,531,994 | B2 * | 1/2026 | Tsai | H04N 19/136 |
| 2015/0172693 | A1 * | 6/2015 | Yang | H04N 19/463 375/240.26 |
| 2015/0195571 | A1 * | 7/2015 | Boyce | H04N 19/36 375/240.16 |
| 2018/0109814 | A1 | 4/2018 | Chuang | |
| 2019/0238877 | A1 * | 8/2019 | Sakurai | H04N 19/46 |
| 2019/0364278 | A1 * | 11/2019 | Lee | H04N 19/174 |
| 2019/0387226 | A1 * | 12/2019 | Lee | H04N 19/176 |
| 2020/0186805 | A1 * | 6/2020 | Lee | H04N 19/174 |
| 2020/0275129 | A1 * | 8/2020 | Deshpande | H04N 19/186 |
| 2021/0014479 | A1 * | 1/2021 | Lee | H04N 19/105 |
| 2021/0029356 | A1 * | 1/2021 | Zhang | H04N 19/136 |
| 2021/0058637 | A1 * | 2/2021 | Zhang | H04N 19/513 |
| 2021/0092431 | A1 * | 3/2021 | Zhang | H04N 19/119 |
| 2021/0227229 | A1 | 7/2021 | Ma | |
| 2021/0235101 | A1 * | 7/2021 | Sim | H04N 19/176 |
| 2021/0337197 | A1 * | 10/2021 | Lee | H04N 19/96 |
| 2021/0400142 | A1 * | 12/2021 | Jorasch | H04L 65/1069 |
| 2021/0400310 | A1 | 12/2021 | Zhang | |
| 2022/0053194 | A1 * | 2/2022 | Zhao | H04N 19/103 |
| 2022/0086439 | A1 * | 3/2022 | Tsai | H04N 19/176 |
| 2022/0283433 | A1 * | 9/2022 | Christmas | G02B 27/0103 |
| 2023/0179805 | A1 * | 6/2023 | He | H04N 19/117 375/240.26 |
| 2025/0126284 | A1 * | 4/2025 | Jhu | H04N 19/132 |
| 2025/0168366 | A1 * | 5/2025 | Francois | H04N 19/132 |

* cited by examiner

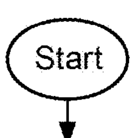
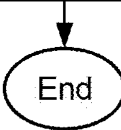
*Fig. 14*

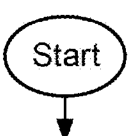

Receiving input data associated with a current block comprising a first-colour block and one or more second-colour blocks, wherein the input data comprise pixel data to be encoded at an encoder side or data associated with the current block to be decoded at a decoder side

1510

Determining a prediction candidate list comprising one or more inherited cross-component prediction candidates

1520

Deriving one or more target model parameter sets associated with a target inherited prediction model based on one or more inherited model parameter sets associated with the target inherited prediction model selected from the prediction candidate list, wherein when the target inherited prediction model corresponds to GLM (Gradient Linear Model), one or more gradient pattems associated with the GLM are also inherited, or when the target inherited prediction model corresponds to MMLM (Multiple Model CCLM Mode) or CCCM (Convolutional Cross-Component Model) with multi-model, a classification threshold associated with the MMLM or the CCCM with multi-mode is also inherited

1530

Encoding or decoding at least one of said one or more second-colour blocks using prediction data comprising cross-colour prediction generated by applying the target inherited prediction model with said one or more target model parameter sets to reconstructed first-colour block

1540

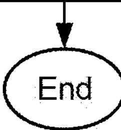

*Fig. 15*

METHOD AND APPARATUS OF INHERITING CROSS-COMPONENT MODEL PARAMETERS IN VIDEO CODING SYSTEM

CROSS REFERENCE TO RELATED APPLICATIONS

The present invention is a non-Provisional application of and claims priority to U.S. Provisional Patent Application No. 63/378,707, filed on Oct. 7, 2022 and U.S. Provisional Patent Application No. 63/380,762, filed on Oct. 25, 2022. The U.S. Provisional patent applications are hereby incorporated by reference in their entireties.

FIELD OF THE INVENTION

The present invention relates to video coding system. In particular, the present invention relates to Cross-Component Prediction related modes in a video coding system.

BACKGROUND

Versatile video coding (VVC) is the latest international video coding standard developed by the Joint Video Experts Team (JVET) of the ITU-T Video Coding Experts Group (VCEG) and the ISO/IEC Moving Picture Experts Group (MPEG). The standard has been published as an ISO standard: ISO/IEC 23090-3:2021, Information technology—Coded representation of immersive media—Part 3: Versatile video coding, published February 2021. VVC is developed based on its predecessor HEVC (High Efficiency Video Coding) by adding more coding tools to improve coding efficiency and also to handle various types of video sources including 3-dimensional (3D) video signals.

FIG. 1A illustrates an exemplary adaptive Inter/Intra video encoding system incorporating loop processing. For Intra Prediction, the prediction data is derived based on previously encoded video data in the current picture. For Inter Prediction 112, Motion Estimation (ME) is performed at the encoder side and Motion Compensation (MC) is performed based on the result of ME to provide prediction data derived from other picture(s) and motion data. Switch 114 selects Intra Prediction 110 or Inter-Prediction 112 and the selected prediction data is supplied to Adder 116 to form prediction errors, also called residues. The prediction error is then processed by Transform (T) 118 followed by Quantization (Q) 120. The transformed and quantized residues are then encoded by Entropy Encoder 122 to be included in a video bitstream corresponding to the compressed video data. The bitstream associated with the transform coefficients is then packed with side information such as motion and coding modes associated with Intra prediction and Inter prediction, and other information such as parameters associated with loop filters applied to underlying image area. The side information associated with Intra Prediction 110, Inter prediction 112 and in-loop filter 130, are provided to Entropy Encoder 122 as shown in FIG. 1A. When an Inter-prediction mode is used, a reference picture or pictures have to be reconstructed at the encoder end as well. Consequently, the transformed and quantized residues are processed by Inverse Quantization (IQ) 124 and Inverse Transformation (IT) 126 to recover the residues. The residues are then added back to prediction data 136 at Reconstruction (REC) 128 to reconstruct video data. The reconstructed video data may be stored in Reference Picture Buffer 134 and used for prediction of other frames.

As shown in FIG. 1A, incoming video data undergoes a series of processing in the encoding system. The reconstructed video data from REC 128 may be subject to various impairments due to a series of processing. Accordingly, in-loop filter 130 is often applied to the reconstructed video data before the reconstructed video data are stored in the Reference Picture Buffer 134 in order to improve video quality. For example, deblocking filter (DF), Sample Adaptive Offset (SAO) and Adaptive Loop Filter (ALF) may be used. The loop filter information may need to be incorporated in the bitstream so that a decoder can properly recover the required information. Therefore, loop filter information is also provided to Entropy Encoder 122 for incorporation into the bitstream. In FIG. 1A, Loop filter 130 is applied to the reconstructed video before the reconstructed samples are stored in the reference picture buffer 134. The system in FIG. 1A is intended to illustrate an exemplary structure of a typical video encoder. It may correspond to the High Efficiency Video Coding (HEVC) system, VP8, VP9, H.264 or VVC.

The decoder, as shown in FIG. 1B, can use similar or portion of the same functional blocks as the encoder except for Transform 118 and Quantization 120 since the decoder only needs Inverse Quantization 124 and Inverse Transform 126. Instead of Entropy Encoder 122, the decoder uses an Entropy Decoder 140 to decode the video bitstream into quantized transform coefficients and needed coding information (e.g. ILPF information, Intra prediction information and Inter prediction information). The Intra prediction 150 at the decoder side does not need to perform the mode search. Instead, the decoder only needs to generate Intra prediction according to Intra prediction information received from the Entropy Decoder 140. Furthermore, for Inter prediction, the decoder only needs to perform motion compensation (MC 152) according to Inter prediction information received from the Entropy Decoder 140 without the need for motion estimation.

According to VVC, an input picture is partitioned into non-overlapped square block regions referred as CTUs (Coding Tree Units), similar to HEVC. Each CTU can be partitioned into one or multiple smaller size coding units (CUs). The resulting CU partitions can be in square or rectangular shapes. Also, VVC divides a CTU into prediction units (PUs) as a unit to apply prediction process, such as Inter prediction, Intra prediction, etc.

The VVC standard incorporates various new coding tools to further improve the coding efficiency over the HEVC standard. Among various new coding tools, some coding tools relevant to the present invention are reviewed as follows. For example, to reduce the cross-component redundancy, a cross-component linear model (CCLM) prediction mode is used in the VVC, for which the chroma samples are predicted based on the reconstructed luma samples of the same CU by using a linear model.

Various cross-component prediction modes are being considered for the emerging new video coding standard. Inheriting model parameters for these cross-component prediction modes is an effective way to reduce data rate related to signalling model parameters. In the present invention, schemes to improve the coding efficiency associated with inheriting model parameters for cross-component prediction modes are disclosed.

BRIEF SUMMARY OF THE INVENTION

A method and apparatus for coding colour pictures using coding tools including one or more cross component models related modes are disclosed. According to the method, input data associated with a current block comprising a first-colour block and one or more second-colour blocks are received, wherein the input data comprise pixel data to be encoded at an encoder side or data associated with the current block to be decoded at a decoder side. A prediction candidate list comprising one or more inherited cross-component prediction candidates is determined. A target model parameter set associated with a target inherited prediction model is derived based on an inherited model parameter set associated with the target inherited prediction model selected from the prediction candidate list, wherein the target model parameter set comprises at least one re-derived or refined parameter being re-derived or refined from the inherited model parameter set, and wherein said at least one re-derived or refined parameter comprises a CCLM offset parameter when the target inherited prediction model corresponds to CCLM (Cross Component Linear Model), or two separate inherited model parameter sets are used for one of one or more second-colour blocks. At least one of said one or more second-colour blocks is encoded or decoded using prediction data comprising cross-colour prediction generated by applying the target inherited prediction model with the target model parameter set to reconstructed first-colour block.

In one embodiment, when the target inherited prediction model corresponds to the CCLM, the target model parameter set comprises a scaling parameter and the CCLM offset parameter, and both the scaling parameter and the CCLM offset parameter are re-derived or refined to derive the target model parameter set.

In one embodiment, when the target inherited prediction model corresponds to CCCM (Convolutional Cross-Component Model), said at least one re-derived or refined parameter comprises a CCCM offset parameter.

In one embodiment, when the target inherited prediction model corresponds to CCCM (Convolutional Cross-Component Model), only a portion of the inherited model parameter set associated with the target inherited prediction model is inherited, and one or more remaining parameters of the target inherited prediction model are re-derived.

In one embodiment, prediction candidates in the prediction candidate list are reordered according to a reordering rule. In one embodiment, the reordering rule depends on coding information of one or more neighbouring blocks or model error associated with each of the prediction candidates. In one embodiment, the reordering rule is based on the model error derived by applying a corresponding prediction model associated with said each of the prediction candidates to one or more neighbouring templates of the current block to generate predicted samples of said one or more neighbouring templates, and then comparing the predicted samples with reconstructed samples of said one or more neighbouring templates. In one embodiment, only partial samples of said one or more neighbouring templates are used to determine the model error.

In one embodiment, a syntax is signalled or parsed to indicate whether the current block uses one inherited cross-component prediction candidate. In one embodiment, the syntax corresponds to an On/Off flag signalled or parsed for each CU, CB, PU, TU, TB, colour component, or chroma colour component.

In one embodiment, a high-level syntax is signalled or parsed in SPS, PPS, PH or SH to indicate whether the target inherited prediction model with said at least one re-derived or refined parameter or whether said two separate inherited model parameter sets are used for said one or more second-colour blocks is allowed for a current sequence, picture, or slice.

In one embodiment, a syntax is signalled or parsed to indicate the target inherited prediction model selected from the prediction candidate list.

According to another method, one or more target model parameter sets associated with a target inherited prediction model are derived based on one or more inherited model parameter sets associated with the target inherited prediction model selected from the prediction candidate list, wherein when the target inherited prediction model corresponds to GLM (Gradient Linear Model), one or more gradient patterns associated with the GLM are also inherited, or when the target inherited prediction model corresponds to MMLM (Multiple Model CCLM Mode) or CCCM (Convolutional Cross-Component Model) with multi-model, a classification threshold associated with the MMLM or the CCCM with multi-mode is also inherited.

In one embodiment, when the target inherited prediction model corresponds to the MMLM or the CCCM with multi-model, the classification threshold is used to classify neighbouring samples of the current block into multiple groups. In one embodiment, one inherited model parameter set is assigned to each of the multiple groups. In one embodiment, an offset parameter of each group is re-derived based on an inherited scaling parameter and an average value of neighbouring first-colour and second-colour samples of each group of the current block.

According to another method, similarity among said one or more inherited cross-component prediction candidates and one or more existing candidates in the prediction candidate list are checked before said one or more inherited cross-component prediction candidates are inserted into the prediction candidate list. A target inherited cross-component prediction candidate is inserted into the prediction candidate list only if a target similarity among the target inherited cross-component prediction candidate and one existing candidate in the prediction candidate list satisfies a condition. A target predictor is derived from the prediction candidate list. The second-colour block is encoded or decoded using the target predictor.

In one embodiment, the condition corresponds to the similarity being larger than a threshold. In one embodiment, the similarity is measured by comparing model parameters of two inherited cross-component prediction candidates. In one embodiment, the target inherited cross-component prediction candidate is not inserted into the prediction candidate list if the model parameter of the target inherited cross-component prediction candidate is the same as the model parameter of another inherited cross-component prediction candidate.

BRIEF DESCRIPTION OF THE DRAWINGS

FIG. 14 illustrates a flowchart of an exemplary video coding system that incorporates inheriting model parameters for cross-component prediction according to an embodiment of the present invention.

FIG. 15 illustrates a flowchart of another exemplary video coding system that incorporates inheriting model parameters for cross-component prediction according to an embodiment of the present invention.

DETAILED DESCRIPTION OF THE INVENTION

It will be readily understood that the components of the present invention, as generally described and illustrated in the figures herein, may be arranged and designed in a wide variety of different configurations. Thus, the following more detailed description of the embodiments of the systems and methods of the present invention, as represented in the figures, is not intended to limit the scope of the invention, as claimed, but is merely representative of selected embodiments of the invention. References throughout this specification to "one embodiment," "an embodiment," or similar language mean that a particular feature, structure, or characteristic described in connection with the embodiment may be included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. One skilled in the relevant art will recognize, however, that the invention can be practiced without one or more of the specific details, or with other methods, components, etc. In other instances, well-known structures, or operations are not shown or described in detail to avoid obscuring aspects of the invention. The illustrated embodiments of the invention will be best understood by reference to the drawings, wherein like parts are designated by like numerals throughout. The following description is intended only by way of example, and simply illustrates certain selected embodiments of apparatus and methods that are consistent with the invention as claimed herein.

Partitioning of the CTUs Using a Tree Structure

In HEVC, a CTU is split into CUs by using a quaternary-tree (QT) structure denoted as coding tree to adapt to various local characteristics. The decision whether to code a picture area using inter-picture (temporal) or intra-picture (spatial) prediction is made at the leaf CU level. Each leaf CU can be further split into one, two or four Pus according to the PU splitting type. Inside one PU, the same prediction process is applied and the relevant information is transmitted to the decoder on a PU basis. After obtaining the residual block by applying the prediction process based on the PU splitting type, a leaf CU can be partitioned into transform units (TUs) according to another quaternary-tree structure similar to the coding tree for the CU. One of key feature of the HEVC structure is that it has the multiple partition conceptions including CU, PU, and TU.

Figure 2:
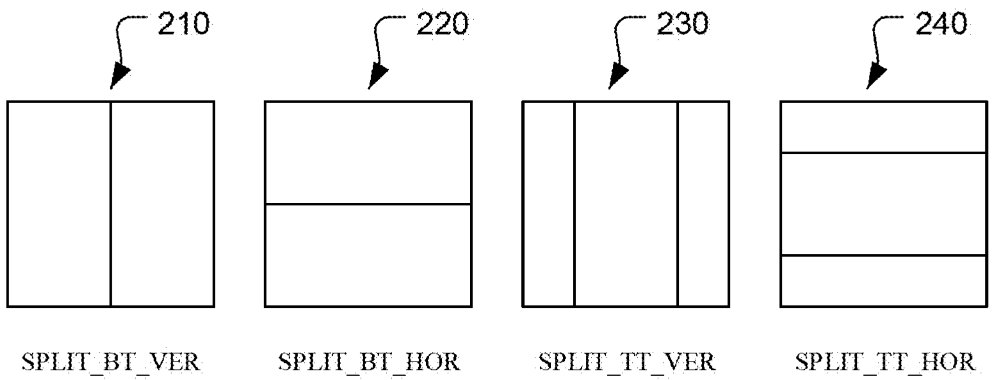
FIG. 2 illustrates examples of a multi-type tree structure corresponding to vertical binary splitting (SPLIT_BT_VER), horizontal binary splitting (SPLIT_BT_HOR), vertical ternary splitting (SPLIT_TT_VER), and horizontal ternary splitting (SPLIT_TT_HOR).

In VVC, a quadtree with nested multi-type tree using binary and ternary splits segmentation structure replaces the concepts of multiple partition unit types, i.e. it removes the separation of the CU, PU and TU concepts except as needed for CUs that have a size too large for the maximum transform length, and supports more flexibility for CU partition shapes. In the coding tree structure, a CU can have either a square or rectangular shape. A coding tree unit (CTU) is first partitioned by a quaternary tree (a.k.a. quadtree) structure. Then the quaternary tree leaf nodes can be further partitioned by a multi-type tree structure. As shown in FIG. 2, there are four splitting types in multi-type tree structure, vertical binary splitting (SPLIT_BT_VER 210), horizontal binary splitting (SPLIT_BT_HOR 220), vertical ternary splitting (SPLIT_TT_VER 230), and horizontal ternary splitting (SPLIT_TT_HOR 240). The multi-type tree leaf nodes are called coding units (CUs), and unless the CU is too large for the maximum transform length, this segmentation is used for prediction and transform processing without any further partitioning. This means that, in most cases, the CU, PU and TU have the same block size in the quadtree with nested multi-type tree coding block structure. The exception occurs when maximum supported transform length is smaller than the width or height of the colour component of the CU.

Figure 3:
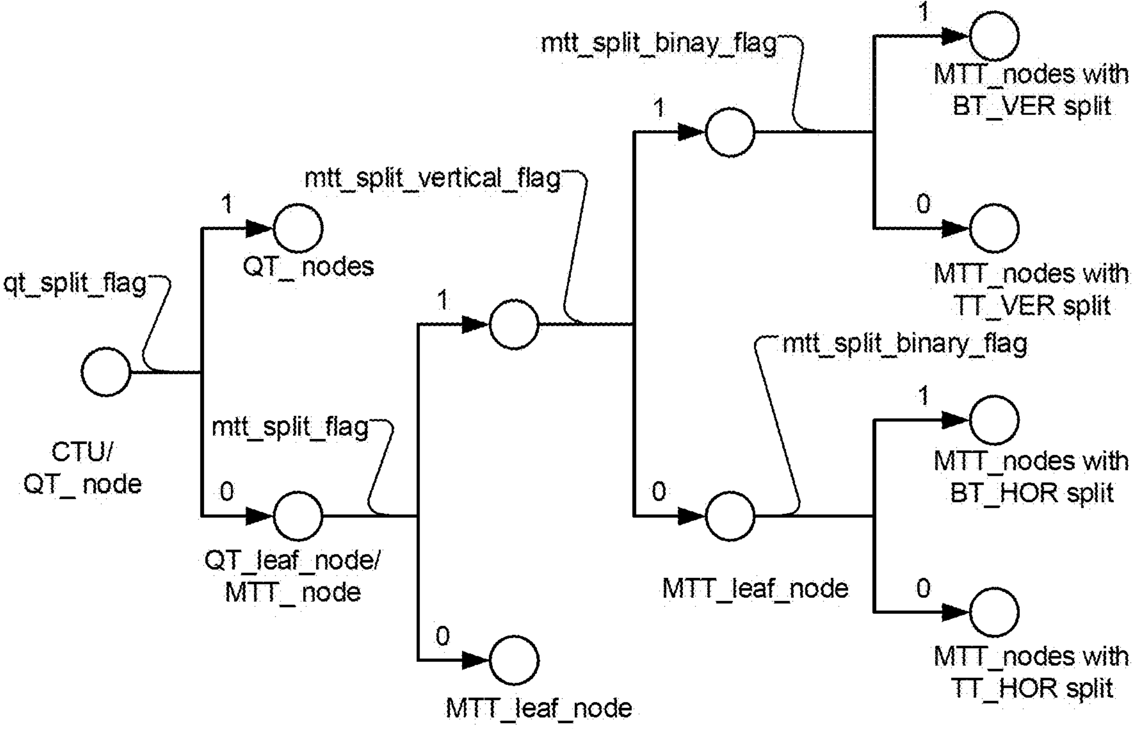
FIG. 3 illustrates an example of the signalling mechanism of the partition splitting information in quadtree with nested multi-type tree coding tree structure.

FIG. 3 illustrates the signalling mechanism of the partition splitting information in quadtree with nested multi-type tree coding tree structure. A coding tree unit (CTU) is treated as the root of a quaternary tree and is first partitioned by a quaternary tree structure. Each quaternary tree leaf node (when sufficiently large to allow it) is then further partitioned by a multi-type tree structure. In quadtree with nested multi-type tree coding tree structure, for each CU node, a first flag (split_cu_flag) is signalled to indicate whether the node is further partitioned. If the current CU node is a quadtree CU node, a second flag (split_qt_flag) whether it's a QT partitioning or MTT partitioning mode. When a is partitioned with MTT partitioning mode, a third flag (mtt_split_cu_vertical_flag) is signalled to indicate the splitting direction, and then a fourth flag (mtt_split_cu_binary_flag) is signalled to indicate whether the split is a binary split or a ternary split. Based on the values of mtt_split_cu_vertical_flag and mtt_split_cu_binary_flag, the multi-type tree slitting mode (MttSplitMode) of a CU is derived as shown in Table 1.

TABLE 1

MttSplitMode derivation based on multi-type tree syntax elements

| MttSplitMode | mtt_split_cu_vertical_flag | mtt_split_cu_binary_flag |
|---|---|---|
| SPLIT_TT_HOR | 0 | 0 |
| SPLIT_BT_HOR | 0 | 1 |
| SPLIT_TT_VER | 1 | 0 |
| SPLIT_BT_VER | 1 | 1 |

Figure 4:
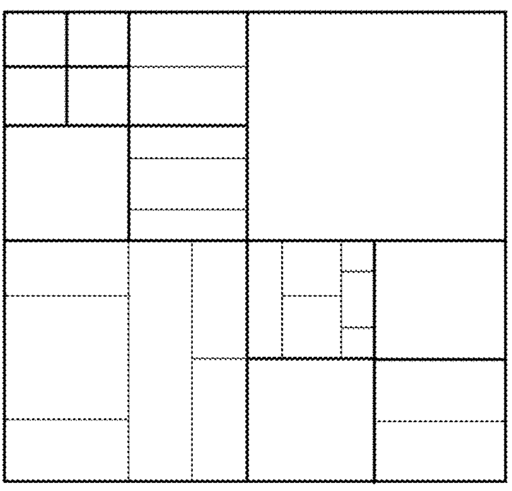
FIG. 4 shows an example of a CTU divided into multiple CUs with a quadtree and nested multi-type tree coding block structure, where the bold block edges represent quadtree partitioning and the remaining edges represent multi-type tree partitioning.

FIG. 4 shows a CTU divided into multiple CUs with a quadtree and nested multi-type tree coding block structure, where the bold block edges represent quadtree partitioning and the remaining edges represent multi-type tree partitioning. The quadtree with nested multi-type tree partition provides a content-adaptive coding tree structure comprised of CUs. The size of the CU may be as large as the CTU or as small as 4×4 in units of luma samples. For the case of the 4:2:0 chroma format, the maximum chroma CB size is 64×64 and the minimum size chroma CB consist of 16 chroma samples.

In VVC, the maximum supported luma transform size is 64×64 and the maximum supported chroma transform size is 32×32. When the width or height of the CB is larger the maximum transform width or height, the CB is automatically split in the horizontal and/or vertical direction to meet the transform size restriction in that direction.

The following parameters are defined for the quadtree with nested multi-type tree coding tree scheme. These parameters are specified by SPS (Sequence Parameter Set) syntax elements and can be further refined by picture header syntax elements.

- CTU size: the root node size of a quaternary tree
- MinQTSize: the minimum allowed quaternary tree leaf node size
- MaxBtSize: the maximum allowed binary tree root node size
- MaxTtSize: the maximum allowed ternary tree root node size
- MaxMttDepth: the maximum allowed hierarchy depth of multi-type tree splitting from a quadtree leaf
- MinCbSize: the minimum allowed coding block node size In one example of the quadtree with nested multi-type tree coding tree structure, the CTU size is set as 128×128 luma samples with two corresponding 64×64 blocks of 4:2:0 chroma samples, the MinQTSize is set as 16×16, the MaxBtSize is set as 128×128 and MaxTtSize is set as 64×64, the MinCbsize (for both width and height) is set as 4×4, and the MaxMttDepth is set as 4. The quaternary tree partitioning is applied to the CTU first to generate quaternary tree leaf nodes. The quaternary tree leaf nodes may have a size from 16×16 (i.e., the MinQTSize) to 128×128 (i.e., the CTU size). If the leaf QT node is 128×128, it will not be further split by the binary tree since the size exceeds the MaxBtSize and MaxTtSize (i.e., 64×64). Otherwise, the leaf qdtree node can be further partitioned by the multi-type tree. Therefore, the quaternary tree leaf node is also the root node for the multi-type tree and it has multi-type tree depth (mttDepth) as 0. When the multi-type tree depth reaches MaxMttDepth (i.e., 4), no further splitting is considered. When the multi-type tree node has width equal to MinCbsize, no further horizontal splitting is considered. Similarly, when the multi-type tree node has height equal to MinCbsize, no further vertical splitting is considered.

In VVC, the coding tree scheme supports the ability for the luma and chroma to have a separate block tree structure. For P and B slices, the luma and chroma CTBs in one CTU have to share the same coding tree structure. However, for I slices, the luma and chroma can have separate block tree structures. When the separate block tree mode is applied, luma CTB is partitioned into CUs by one coding tree structure, and the chroma CTBs are partitioned into chroma CUs by another coding tree structure. This means that a CU in an I slice may consist of a coding block of the luma component or coding blocks of two chroma components, and a CU in a P or B slice always consists of coding blocks of all three colour components unless the video is monochrome.

Intra Mode Coding with 67 Intra Prediction Modes

Figure 5:
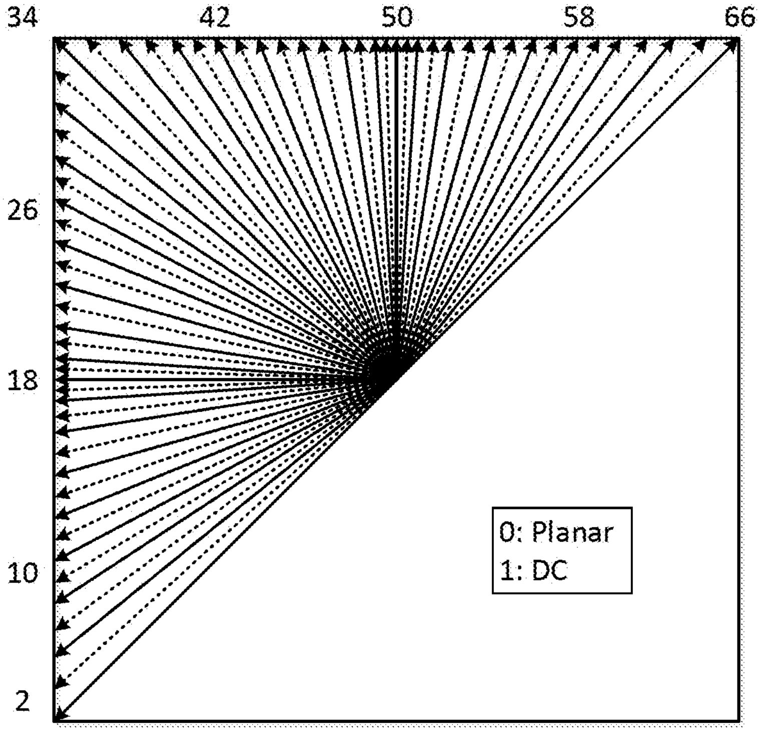
FIG. 5 shows the intra prediction modes as adopted by the VVC video coding standard.

To capture the arbitrary edge directions presented in natural video, the number of directional intra modes in VVC is extended from 33, as used in HEVC, to 65. The new directional modes not in HEVC are depicted as red dotted arrows in FIG. 5, and the planar and DC modes remain the same. These denser directional intra prediction modes apply for all block sizes and for both luma and chroma intra predictions.

In VVC, several conventional angular intra prediction modes are adaptively replaced with wide-angle intra prediction modes for the non-square blocks.

In HEVC, every intra-coded block has a square shape and the length of each of its side is a power of 2. Thus, no division operations are required to generate an intra-predictor using DC mode. In VVC, blocks can have a rectangular shape that necessitates the use of a division operation per block in the general case. To avoid division operations for DC prediction, only the longer side is used to compute the average for non-square blocks.

To keep the complexity of the most probable mode (MPM) list generation low, an intra mode coding method with 6 MPMs is used by considering two available neighbouring intra modes. The following three aspects are considered to construct the MPM list:

- Default intra modes
- Neighbouring intra modes
- Derived intra modes.

A unified 6-MPM list is used for intra blocks irrespective of whether MRL and ISP coding tools are applied or not. The MPM list is constructed based on intra modes of the left and above neighbouring block. Suppose the mode of the left is denoted as Left and the mode of the above block is denoted as Above, the unified MPM list is constructed as follows:

- When a neighbouring block is not available, its intra mode is set to Planar by default.
- If both modes Left and Above are non-angular modes:
  - MPM list→{Planar, DC, V, H, V−4, V+4}
- If one of modes Left and Above is angular mode, and the other is non-angular:
  - Set a mode Max as the larger mode in Left and Above
  - MPM list→{Planar, Max, Max−1, Max+1, Max−2, M+2}
- If Left and Above are both angular and they are different:
  - Set a mode Max as the larger mode in Left and Above
  - If Max−Min is equal to 1:
    - MPM list→{Planar, Left, Above, Min−1, Max+1, Min−2}
  - Otherwise, if Max-Min is greater than or equal to 62:
    - MPM list→{Planar, Left, Above, Min+1, Max−1, Min+2}

Otherwise, if Max−Min is equal to 2:

MPM list→{Planar, Left, Above, Min+1, Min−1, Max+1}

Otherwise:

MPM list→{Planar, Left, Above, Min−1, −Min+1, Max−1}

If Left and Above are both angular and they are the same:

MPM list→{Planar, Left, Left−1, Left+1, Left−2, Left+2}

Besides, the first bin of the MPM index codeword is CABAC context coded. In total three contexts are used, corresponding to whether the current intra block is MRL enabled, ISP enabled, or a normal intra block.

During 6 MPM list generation process, pruning is used to remove duplicated modes so that only unique modes can be included into the MPM list. For entropy coding of the 61 non-MPM modes, a Truncated Binary Code (TBC) is used.

Cross-Component Linear Model (CCLM) Prediction

To reduce the cross-component redundancy, a cross-component linear model (CCLM) prediction mode is used in the VVC, for which the chroma samples are predicted based on the reconstructed luma samples of the same CU by using a linear model as follows:

$$pred_C(i,j)=\alpha\cdot rec_L'(i,j)+\beta \tag{1}$$

where $pred_C(i, j)$ represents the predicted chroma samples in a CU and $rec_L(i, j)$ represents the downsampled reconstructed luma samples of the same CU.

The CCLM parameters (α and β) are derived with at most four neighbouring chroma samples and their corresponding down-sampled luma samples. Suppose the current chroma block dimensions are W×H, then W' and H' are set as W'=W, H'=H when LM_LA mode is applied;

W'=W+H when LM_A mode is applied;

H'=H+W when LM_L mode is applied.

The above neighbouring positions are denoted as S[0, −1] . . . S[W'−1, −1] and the left neighbouring positions are denoted as S[−1, 0] . . . S[−1, H'−1]. Then the four samples are selected as S[W'/4, −1], S[3*W'/4, −1], S[−1, H'/4], S[−1, 3*H'/4] when LM mode is applied and both above and left neighbouring samples are available;

S[W'/8, −1], S[3*W'/8, −1], S[5*W'/8, −1], S[7*W'/8, −1] when LM-A mode is applied or only the above neighbouring samples are available;

S[−1, H'/8], S[−1, 3*H'/8], S[−1, 5*H'/8], S[−1, 7*H'/8] when LM-L mode is applied or only the left neighbouring samples are available.

The four neighbouring luma samples at the selected positions are down-sampled and compared four times to find two larger values: $x^0_A$ and $x^1_A$, and two smaller values: $x^0_B$ and $x^1_B$. Their corresponding chroma sample values are denoted as $y^0_A$, $y^1_A$, $y^0_B$ and $y^1_B$. Then $x_A$, $x_B$, $y_A$ and $y_B$ are derived as:

$$\begin{aligned} Xa &= (x0A + x1A + 1) \gg 1; \\ Xb &= (x0B + x1B + 1) \gg 1; \\ Ya &= (y0A + y1A + 1) \gg 1; \\ Yb &= (y0B + y1B + 1) \gg 1 \end{aligned} \tag{2}$$

Finally, the linear model parameters a and B are obtained according to the following equations.

$$\alpha=\frac{Y_a-Y_b}{X_a-X_b} \tag{3}$$

$$\beta=Y_b-\alpha\cdot X_b \tag{4}$$

Figure 6:
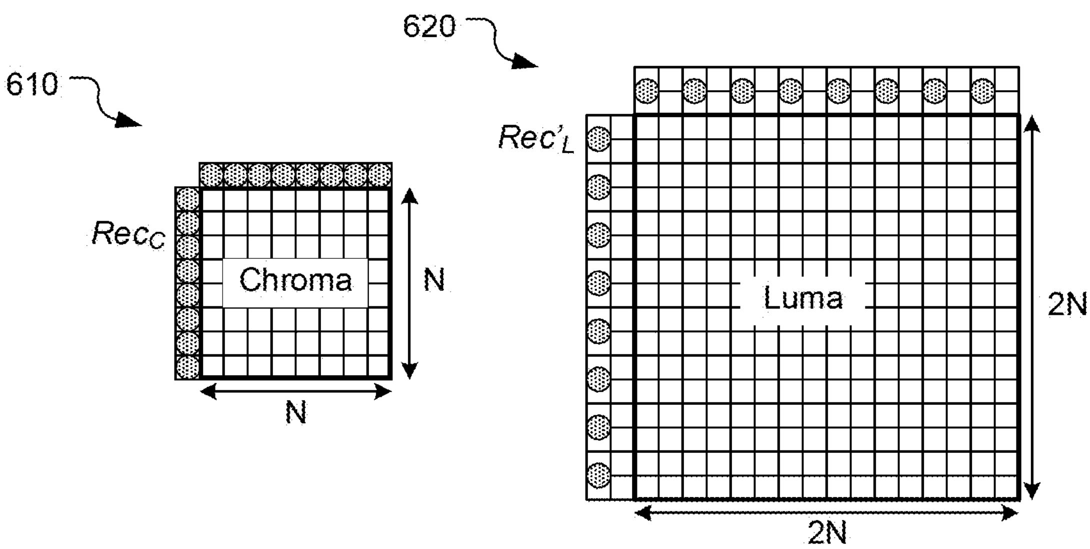
FIG. 6 shows an example of the location of the left and above samples and the sample of the current block involved in the LM_LA mode.

FIG. 6 shows an example of the location of the left and above samples and the sample of the current block involved in the LM_LA mode. FIG. 6 shows the relative sample locations of N×N chroma block 610, the corresponding 2N×2N luma block 620 and their neighbouring samples (shown as filled circles).

The division operation to calculate parameter α is implemented with a look-up table. To reduce the memory required for storing the table, the diff value (difference between maximum and minimum values) and the parameter α are expressed by an exponential notation. For example, diff is approximated with a 4-bit significant part and an exponent. Consequently, the table for 1/diff is reduced into 16 elements for 16 values of the significand as follows:

$$DivTable[\,]=\{0,7,6,5,5,4,4,3,3,2,2,1,1,1,1,0\} \tag{5}$$

This would have a benefit of both reducing the complexity of the calculation as well as the memory size required for storing the needed tables.

Besides the above template and left template can be used to calculate the linear model coefficients together, they also can be used alternatively in the other 2 LM modes, called LM_A, and LM_L modes.

In LM_A mode, only the above template is used to calculate the linear model coefficients. To get more samples, the above template is extended to (W+H) samples. In LM_L mode, only left template are used to calculate the linear model coefficients. To get more samples, the left template is extended to (H+W) samples.

In LM_LA mode, left and above templates are used to calculate the linear model coefficients.

To match the chroma sample locations for 4:2:0 video sequences, two types of down-sampling filter are applied to luma samples to achieve 2 to 1 down-sampling ratio in both horizontal and vertical directions. The selection of down-sampling filter is specified by a SPS level flag. The two down-sampling filters are as follows, which are corresponding to "type-0" and "type-2" content, respectively.

$$\begin{aligned} Rec_L'(i,j) = [&rec_L(2i-1,2j-1) + \\ &2\cdot rec_L(2i-1,2j-1)+rec_L(2i+1,2j-1) + \\ &rec_L(2i-1,2j)+2\cdot rec_L(2i,2j)+rec_L(2i+1,2j)+4] \gg 3 \end{aligned} \tag{6}$$

$$\begin{aligned} Rec_L'(i,j) = &rec_L(2i,2j-1)+rec_L(2i-1,2j) + \\ &4\cdot rec_L(2i,2j)+rec_L(2i+1,2j)+rec_L(2i,2j+1)+4] \gg 3 \end{aligned} \tag{7}$$

Note that only one luma line (general line buffer in intra prediction) is used to make the down-sampled luma samples when the upper reference line is at the CTU boundary.

This parameter computation is performed as part of the decoding process, and is not just as an encoder search operation. As a result, no syntax is used to convey the α and β values to the decoder.

For chroma intra mode coding, a total of 8 intra modes are allowed for chroma intra mode coding. Those modes include five traditional intra modes and three cross-component linear model modes (LM_LA, LM_A, and LM_L). Chroma mode signalling and derivation process are shown in Table 2. Chroma mode coding directly depends on the intra prediction mode of the corresponding luma block. Since separate block partitioning structure for luma and chroma components is enabled in I slices, one chroma block may correspond to multiple luma blocks. Therefore, for Chroma DM mode, the intra prediction mode of the corresponding luma block covering the centre position of the current chroma block is directly inherited.

TABLE 2

Derivation of chroma prediction mode from luma mode when CCLM is allowed.

| Chroma prediction | Corresponding luma intra prediction mode | | | | |
|---|---|---|---|---|---|
| mode | 0 | 50 | 18 | 1 | X (0 <= X <= 66) |
| 0 | 66 | 0 | 0 | 0 | 0 |
| 1 | 50 | 66 | 50 | 50 | 50 |
| 2 | 18 | 18 | 66 | 18 | 18 |
| 3 | 1 | 1 | 1 | 66 | 1 |
| 4 | 0 | 50 | 18 | 1 | X |
| 5 | 81 | 81 | 81 | 81 | 81 |
| 6 | 82 | 82 | 82 | 82 | 82 |
| 7 | 83 | 83 | 83 | 83 | 83 |

A single binarization table is used regardless of the value of sps_cclm_enabled_flag as shown in Table 3.

TABLE 3

Unified binarization table for chroma prediction mode

| Value of intra_chroma_pred_mode | Bin string |
|---|---|
| 4 | 00 |
| 0 | 0100 |
| 1 | 0101 |
| 2 | 0110 |
| 3 | 0111 |
| 5 | 10 |
| 6 | 110 |
| 7 | 111 |

In Table 3, the first bin indicates whether it is regular (0) or CCLM modes (1). If it is LM mode, then the next bin indicates whether it is LM_LA (0) or not. If it is not LM_LA, next 1 bin indicates whether it is LM_L (0) or LM_A (1). For this case, when sps_cclm_enabled_flag is 0, the first bin of the binarization table for the corresponding intra_chroma_pred_mode can be discarded prior to the entropy coding. Or, in other words, the first bin is inferred to be 0 and hence not coded. This single binarization table is used for both sps_cclm_enabled_flag equal to 0 and 1 cases. The first two bins Table 3 are context coded with its own context model, and the rest bins are bypass coded.

In addition, in order to reduce luma-chroma latency in dual tree, when the 64×64 luma coding tree node is partitioned with Not Split (and ISP is not used for the 64×64 CU) or QT, the chroma CUs in 32×32/32×16 chroma coding tree node are allowed to use CCLM in the following way:

- If the 32×32 chroma node is not split or partitioned QT split, all chroma CUs in the 32×32 node can use CCLM
- If the 32×32 chroma node is partitioned with Horizontal BT, and the 32×16 child node does not split or uses Vertical BT split, all chroma CUs in the 32×16 chroma node can use CCLM.

In all the other luma and chroma coding tree split conditions, CCLM is not allowed for chroma CU.

Multiple Model CCLM (MMLM)

In the JEM (J. Chen, E. Alshina, G. J. Sullivan, J.-R. Ohm, and J. Boyce, Algorithm Description of Joint Exploration Test Model 7, document JVET-G1001, ITU-T/ISO/IEC Joint Video Exploration Team (JVET), July 2017), multiple model CCLM mode (MMLM) is proposed for using two models for predicting the chroma samples from the luma samples for the whole CU. In MMLM, neighbouring luma samples and neighbouring chroma samples of the current block are classified into two groups, each group is used as a training set to derive a linear model (i.e., a particular α and β are derived for a particular group). Furthermore, the samples of the current luma block are also classified based on the same rule for the classification of neighbouring luma samples.

Figure 7:
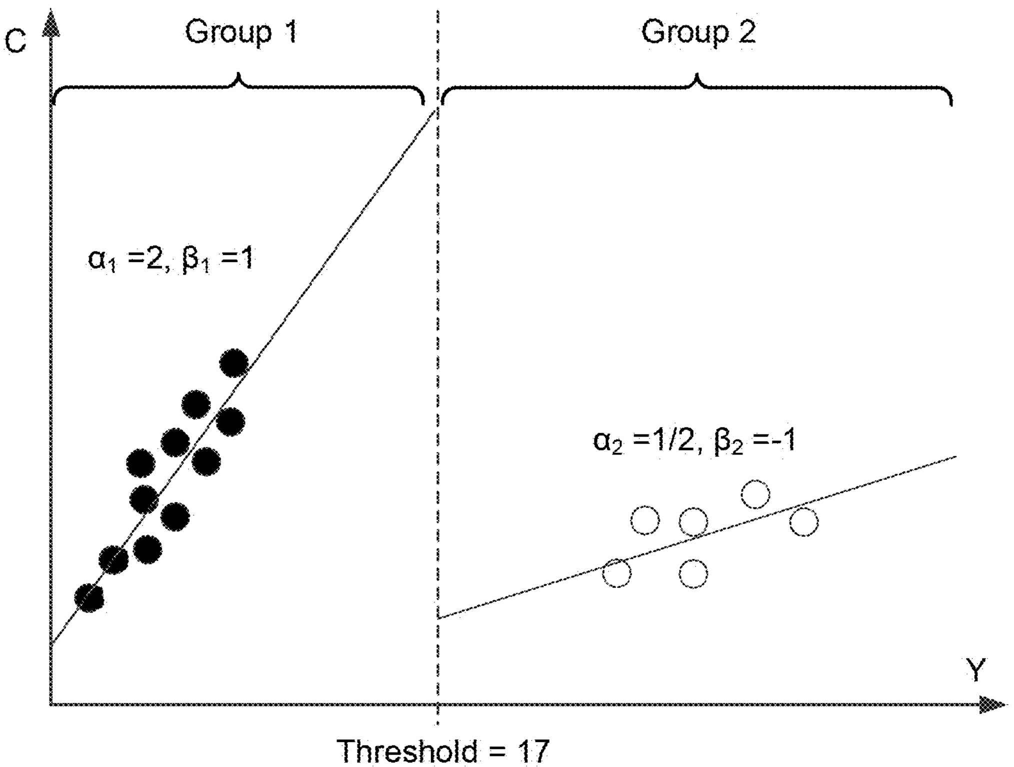
FIG. 7 shows an example of classifying the neighbouring samples into two groups according to multiple mode CCLM.

FIG. 7 shows an example of classifying the neighbouring samples into two groups. Threshold is calculated as the average value of the neighbouring reconstructed luma samples. A neighbouring sample with $Rec'_L[x,y]$<=Threshold is classified into group 1; while a neighbouring sample with $Rec'_L[x,y]$>Threshold is classified into group 2.

$$\begin{cases} Pred_C[x,y] = \alpha_1 \times Rec'_L[x,y] + \beta_1 & \text{if } Rec'_L[x,y] \le \text{Threshold} \\ Pred_C[x,y] = \alpha_2 \times Rec'_L[x,y] + \beta_2 & \text{if } Rec'_L[x,y] > \text{Threshold} \end{cases} \quad (8)$$

Convolutional Cross-Component Model (CCCM)

Figure 8:
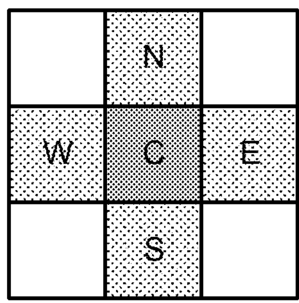
FIG. 8 illustrates an example of spatial part of the convolutional filter.

In CCCM, a convolutional model is applied to improve the chroma prediction performance. The convolutional model has 7-tap filter consisting of a 5-tap plus sign shape spatial component, a nonlinear term and a bias term. The input to the spatial 5-tap component of the filter consists of a centre (C) luma sample which is collocated with the chroma sample to be predicted and its above/north (N), below/south(S), left/west (W) and right/east (E) neighbours as shown in FIG. 8.

The nonlinear term (denoted as P) is represented as power of two of the centre luma sample C and scaled to the sample value range of the content:

$$P = (C * C + midVal) \gg bitDepth.$$

For example, for 10-bit contents, the nonlinear term is calculated as:

$$P = (C * C + 512) \gg 10$$

The bias term (denoted as B) represents a scalar offset between the input and output (similarly to the offset term in CCLM) and is set to the middle chroma value (512 for 10-bit content).

Output of the filter is calculated as a convolution between the filter coefficients $c_i$ and the input values and clipped to the range of valid chroma samples:

$$predChromaVal = c_0C + c_1N + c_2S + c_3E + c_4W + c_5P + c_6B$$

Figure 9:
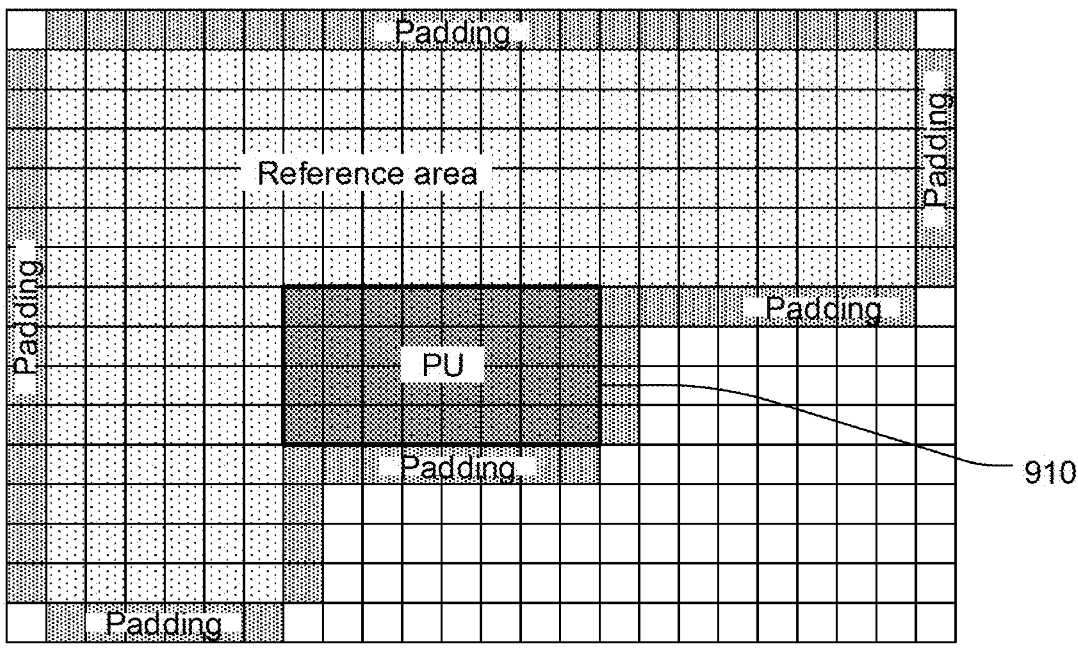
FIG. 9 illustrates an example of reference area with paddings used to derive the filter coefficients.

The filter coefficients $c_i$ are calculated by minimising MSE between predicted and reconstructed chroma samples in the reference area. FIG. 9 illustrates an example of the reference area which consists of 6 lines of chroma samples above and left of the PU 910. Reference area extends one PU width to the right and one PU height below the PU boundaries. Area is adjusted to include only available samples. The extensions to the area (indicated as "paddings") are needed to support the "side samples" of the plus-shaped spatial filter in FIG. 8 and are padded when in unavailable areas.

The MSE minimization is performed by calculating autocorrelation matrix for the luma input and a cross-correlation vector between the luma input and chroma output. Autocorrelation matrix is LDL decomposed and the final filter coefficients are calculated using back-substitution. The process follows roughly the calculation of the ALF filter coefficients in ECM, however LDL decomposition was chosen instead of Cholesky decomposition to avoid using square root operations.

Gradient Linear Model (GLM)

Compared with the CCLM, instead of down-sampled luma values, the GLM utilizes luma sample gradients to derive the linear model. Specifically, when the GLM is applied, the input to the CCLM process, i.e., the down-sampled luma samples L, are replaced by luma sample gradients G. The other parts of the CCLM (e.g., parameter derivation, prediction sample linear transform) are kept unchanged.

$$C = \alpha \cdot G + \beta$$

Figure 10:
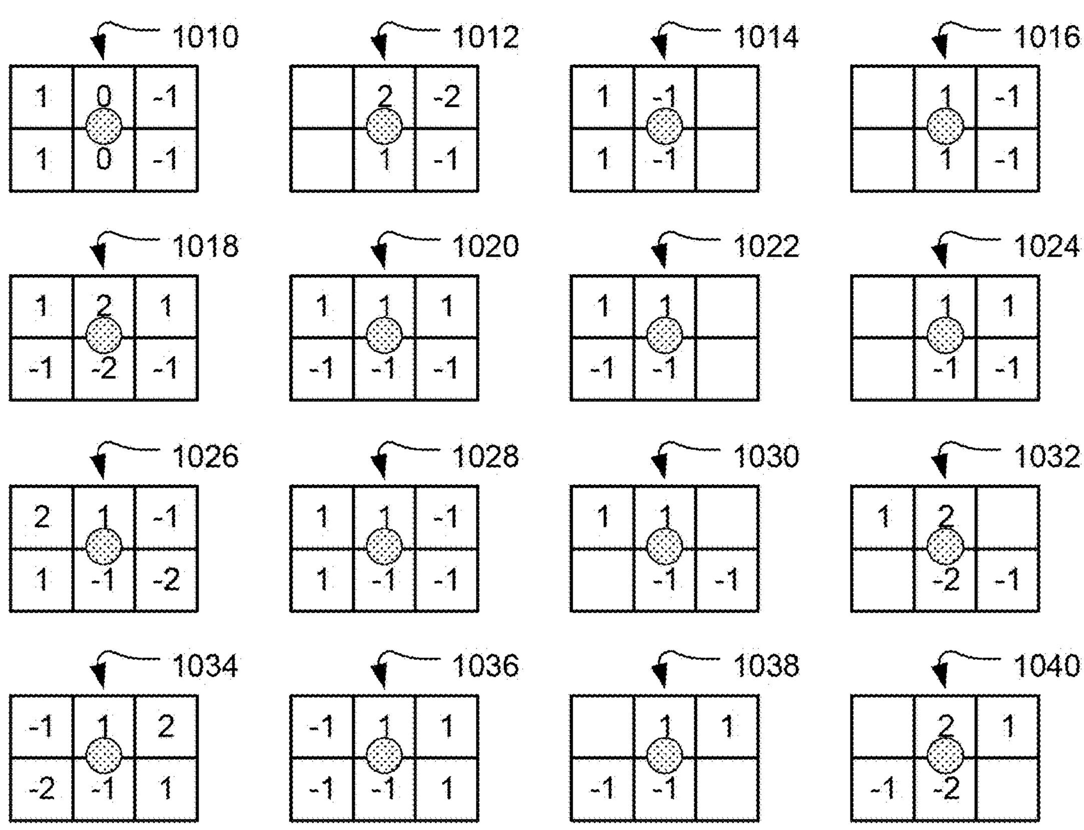
FIG. 10 illustrates the 16 gradient patterns for Gradient Linear Model (GLM).

For signalling, when the CCLM mode is enabled for the current CU, two flags are signalled separately for Cb and Cr components to indicate whether GLM is enabled for each component. If the GLM is enabled for one component, one syntax element is further signalled to select one of 16 gradient filters (1010-1040 in FIG. 10) for the gradient calculation. The GLM can be combined with the existing CCLM by signalling one extra flag in bitstream. When such combination is applied, the filter coefficients that are used to derive the input luma samples of the linear model are calculated as the combination of the selected gradient filter of the GLM and the down-sampling filter of the CCLM.

In order to improve the prediction accuracy or coding performance of cross-component prediction, various schemes related to inheriting cross-component models are disclosed.

Guided Parameter Set for Refining the Cross-Component Model Parameters

According to this method, the guided parameter set is used to refine the derived model parameters by a specified CCLM mode. For example, the guided parameter set is explicitly signalled in the bitstream, after deriving the model parameters, the guided parameter set is added to the derived model parameters as the final model parameters. The guided parameter set contain at least one of a differential scaling parameter (dA), a differential offset parameter (dB), and a differential shift parameter (dS). For example, equation (1) can be rewritten as:

$$pred_C(i, j) = ((\alpha' \cdot rec_L'(i, j)) \gg s) + \beta,$$

and if dA is signalled, the final prediction is:

$$pred_C(i, j) = (((\alpha' + dA) \cdot rec_L'(i, j)) \gg s) + \beta.$$

Similarly, if dB is signalled, then the final prediction is:

$$pred_C(i, j) = ((\alpha' \cdot rec_L'(i, j)) \gg s) + (\beta + \mathrm{dB}).$$

If dS is signalled, then the final prediction is:

$$pred_C(i, j) = ((\alpha' \cdot rec_L'(i, j)) \gg (s + dS)) + \beta.$$

If dA and dB are signalled, then the final prediction is:

$$pred_C(i, j) = (((\alpha' + dA) \cdot rec_L'(i, j)) \gg s) + (\beta + \mathrm{dB}).$$

The guided parameter set can be signalled per colour component. For example, one guided parameter set is signalled for Cb component, and another guided parameter set is signalled for Cr component. Alternatively, one guided parameter set can be signalled and shared among colour components. The signalled dA and dB can be a positive or negative value. When signalling dA, one bin is signalled to indicate the sign of dA. Similarly, when signalling dB, one bin is signalled to indicate the sign of dB.

For another embodiment, if dA is signalled, dB can be implicitly derived from the average value of neighbouring (e.g. L-shape) reconstructed samples. For example, in VVC, four neighbouring luma and chroma reconstructed samples are selected to derived model parameters. Suppose the average value of neighbouring luma and chroma samples are lumaAvg and chromaAvg, then β is derived by β=chromaAvg−(α'+dA)·lumaAvg. The average value of neighbouring luma samples (i.e., lumaAvg) can be calculated by all selected luma samples, the luma DC mode value of the current luma CB, or the average of the maximum and minimum luma samples $$(\text{e.g., } lumaAvg = (\mathrm{Max}(x_A^0, x_A^1) + \mathrm{Min}(x_B^0, x_B^1) + 1) \gg 1, \text{ or } lumaAvg = (\mathrm{Min}(x_A^0, x_A^1) + \mathrm{Max}(x_B^0, x_B^1) + 1) \gg 1).$$

Similarly, average value of neighbouring chroma samples (i.e., chromaAvg) can be calculated by all selected chroma samples, the chroma DC mode value of the current chroma CB, or the average of the maximum and minimum chroma samples $$(\text{e.g., } chromaAvg = (\mathrm{Max}(y_A^0, y_A^1) + \mathrm{Min}(y_B^0, y_B^1) + 1) \gg 1, \text{ or } chromaAvg = (\mathrm{Min}(y_A^0, y_A^1) + \mathrm{Max}(y_B^0, y_B^1) + 1) \gg 1).$$

Note, for non-4:4:4 colour subsampling format, the selected neighbouring luma reconstructed samples can be from the output of CCLM downsampling process.

For another embodiment, the shift parameter, s, can be a constant value (e.g., s can be 3, 4, 5, 6, 7, or 8), and dS is equal to 0 and no need to be signalled.

For another embodiment, in MMLM, the guided parameter set can also be signalled per model. For example, one guided parameter set is signalled for one model and another guided parameter set is signalled for another model. Alternatively, one guided parameter set is signalled and shared among linear models. Or only one guided parameter set is signalled for one selected model, and another model is not further refined by guided parameter set.

Inherit Neighbouring Model Parameters for Refining the Cross-Component Model Parameters The final scaling parameter of the current block is inherited from the neighbouring blocks and further refined by dA (e.g., dA derivation or signalling can be similar or the same as the method in the previous "Guided parameter set for refining the cross-component model parameters"). Once the final scaling parameter is determined, the offset parameter (e.g., $\beta$ in CCLM) is derived based on the inherited scaling parameter and the average value of neighbouring luma and chroma samples of the current block. For example, if the final scaling parameter is inherited from a selected neighbouring block, and the inherited scaling parameter is $\alpha'_{nei}$, then the final scaling parameter is $(\alpha'_{nei}+dA)$. For yet another embodiment, the final scaling parameter is inherited from a historical list and further refined by dA. For example, the historical list records the most recent j entries of final scaling parameters from previous CCLM-coded blocks. Then, the final scaling parameter is inherited from one selected entry of the historical list, $\alpha'_{list}$, and the final scaling parameter is $(\alpha'_{list}+dA)$. For yet another embodiment, the final scaling parameter is inherited from a historical list or the neighbouring blocks, but only the MSB (Most Significant Bit) part of the inherited scaling parameter is taken, and the LSB (Least Significant Bit) of the final scaling parameter is from dA. For yet another embodiment, the final scaling parameter is inherited from a historical list or the neighbouring blocks, but does not further refine by dA.

For yet another embodiment, after inheriting model parameters, the offset can be further refined by dB. For example, if the final offset parameter is inherited from a selected neighbouring block, and the inherited offset parameter is $\beta'_{nei}$, then the final offset parameter is $(\beta'_{nei}+dB)$. For still another embodiment, the final offset parameter is inherited from a historical list and further refined by dB. For example, the historical list records the most recent j entries of final offset parameters from previous CCLM-coded blocks. Then, the final offset parameter is inherited from one selected entry of the historical list, $\beta'_{list}$, and the final offset parameter is $(\beta'_{list}+dB)$.

For yet another embodiment, if the inherited neighbour block is coded with CCCM, the filter coefficients ($c_i$) are inherited. The offset parameter (e.g., $c_6 \times B$ or $c_6$ in CCCM) can be re-derived based on the inherited parameter and the average value of neighbouring corresponding position luma and chroma samples of the current block. For still another embodiment, only partial filter coefficients are inherited (e.g., only n out of 6 filter coefficients are inherited, where $1 \le n < 6$), the rest filter coefficients are further re-derived using the neighbouring luma and chroma samples of the current block.

For still another embodiment, if the inherited candidate applies GLM gradient pattern to its luma reconstructed samples, the current block shall also inherit the GLM gradient pattern of the candidate and apply to the current luma reconstructed samples.

For still another embodiment, if the inherited neighbour block is coded with multiple cross-component models (e.g., MMLM, or CCCM with multi-model), the classification threshold is also inherited to classify the neighbouring samples of the current block into multiple groups, and the inherited multiple cross-component model parameters are further assigned to each group. For yet another embodiment, the classification threshold is the average value of the neighbouring reconstructed luma samples, and the inherited multiple cross-component model parameters are further assigned to each group. Similarly, once the final scaling parameter of each group is determined, the offset parameter of each group is re-derived based on the inherited scaling parameter and the average value of neighbouring luma and chroma samples of each group of the current block. For another example, if CCCM with multi-model is used, once the final coefficient parameter of each group is determined (e.g., $c_0$ to $c_5$ except for $c_6$ in CCCM), the offset parameter (e.g., $c_6 \times B$ or $c_6$ in CCCM) of each group is re-derived based on the inherited coefficient parameter and the neighbouring luma and chroma samples of each group of the current block.

For still another embodiment, inheriting model parameters may depend on the colour component. For example, Cb and Cr components may inherit model parameters or model derivation method from the same candidate or different candidates. For yet another example, only one of colour components inherits model parameters, and the other colour component derives model parameters based on the inherited model derivation method (e.g., if the inherit candidate is coded by MMLM or CCCM, the current block also derives model parameters based on MMLM or CCCM using the current neighbouring reconstructed samples). For still another example, only one of colour components inherits model parameters, and the other colour component derives its model parameters using the current neighbouring reconstructed samples.

For yet another embodiment, after decoding a block, a cross-component model of the current block is derived and stored for later reconstruction process of neighbouring blocks using inherited neighbours model parameter. For example, even the current block is coded by inter prediction, the cross-component model parameters of the current block can be derived by using the current luma and chroma reconstruction or prediction samples. Later, if another block is predicted by using inherited neighbours model parameters, it can inherit the model parameters from the current block. For another example, the current block is coded by cross-component prediction, the cross-component model parameters of the current block are re-derived by using the current luma and chroma reconstruction or prediction samples. For another example, the stored cross-component model can be CCCM, LM_LA (i.e., single model LM using both above and left neighbouring samples to derive model), or MMLM_LA (i.e., multi-model LM using both above and left neighbouring samples to derive model).

Inheriting Temporal Neighbouring Model Parameters

Figure 11:
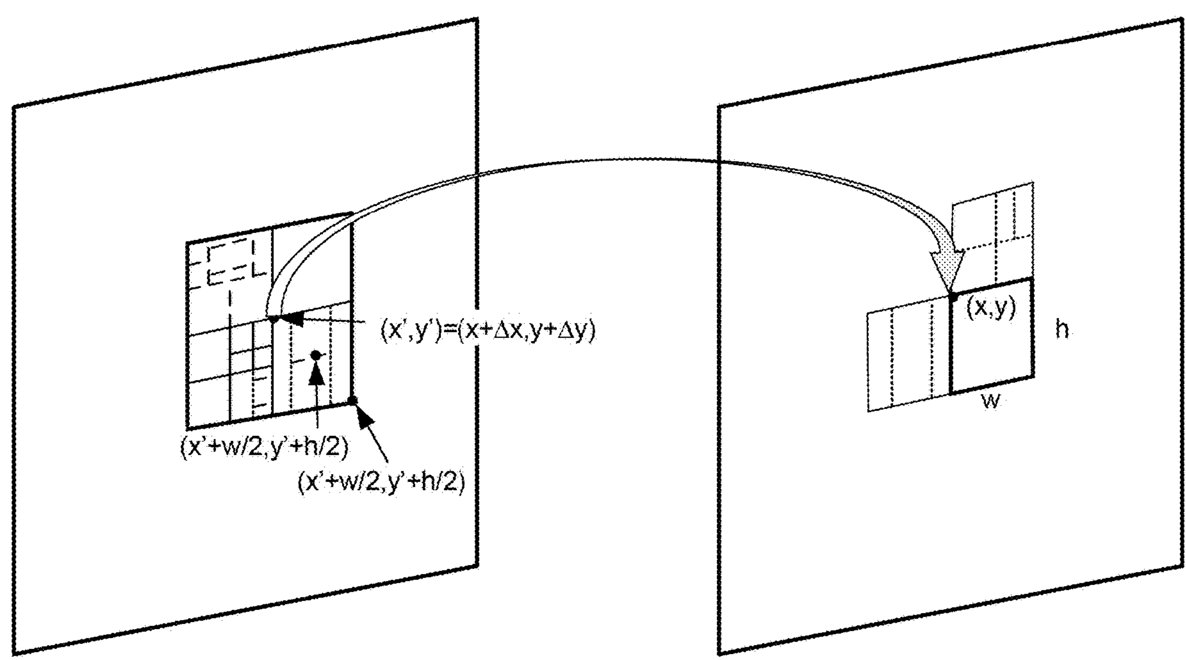
FIG. 11 illustrates an example of inheriting temporal neighbouring model parameters.

For still another embodiment, if the current slice/picture is a non-intra slice/picture, the inherited model parameters can be from the block in the previous coded slices/pictures. For example, as shown in the FIG. 11, the current block position is at (x, y) and the block size is w×h. The inherited model parameters can be from the block at position (x', y'), (x', y'+h/2), (x'+w/2, y'), (x'+w/2, y'+h/2), (x'+w, y'), (x', y'+h), or (x'+w, y'+h) of the previous coded slices/picture, where $x'=x+\Delta x$ and $y'=y+\Delta y$. In one embodiment, if the prediction mode of the current block is intra, $\Delta x$ and $\Delta y$ are set to 0. If the prediction mode of the current block is inter, $\Delta x$ and $\Delta y$ are set to the horizontal and vertical motion vector of the current block. In another embodiment, if the current block is inter bi-prediction, $\Delta x$ and $\Delta y$ are set to the horizontal and vertical motion vectors in reference picture list 0. In still another embodiment, if the current block is inter bi-prediction, $\Delta x$ and $\Delta y$ are set to the horizontal and vertical motion vectors in reference picture list 1.

Removing or Modifying Similar Neighbouring Model Parameters

When inheriting cross-component model parameters from other blocks, it can further check the similarity between the inherited model and the existing models in the candidate list or those model candidates derived by the neighbouring reconstructed samples of the current block (e.g., models derived by CCLM, MMLM, or CCCM using the neighbouring reconstructed samples of the current block). If the model of a candidate parameter is similar to the existing models, the model will not be included in the candidate list. In one embodiment, it can compare the similarity of ($\alpha\times$lumaAvg+$\beta$) or $\alpha$ among existing candidates to decide whether to include the model of a candidate or not. For example, if the ($\alpha\times$lumaAvg+$\beta$) or $\alpha$ of the candidate is the same as one of the existing candidates, the model of the candidate is not included. For another example, if the difference of ($\alpha\times$lumaAvg+$\beta$) or $\alpha$ between the candidate and one of existing candidates is less than a threshold, the model of the candidate is not included. Besides, the threshold can be adaptive based on coding information (e.g., the current block size or area). For another example, when comparing the similarity, if a model from a candidate and the existing model both use CCCM, it can compare similarity by checking the value of ($c_0C+c_1N+c_2S+c_3E+c_4W+c_5P+c_6B$) to decide whether to include the model of a candidate or not. In another embodiment, if a candidate position point to a CU which is the same one of the existing candidates, the model of the candidate parameter is not included. In still another embodiment, if the model of a candidate is similar to one of existing candidate models, it can adjust the inherited model parameters so that the inherited model is different from the existing candidate models. For example, if the inherited scaling parameter is similar to one of existing candidate models, the inherited scaling parameter can add a predefined offset (e.g., 1>>S or −(1>>S), where S is the shift parameter) so that the inherited parameter is different from the existing candidate models.

Reordering the Candidates in the List

The candidates in the list can be reordered to reduce the syntax overhead when signalling the selected candidate index. The reordering rules can depend on the coding information of neighbouring blocks or the model error. For example, if neighbouring above or left blocks are coded by MMLM, the MMLM candidates in the list can be moved to the head of the current list. Similarly, if neighbouring above or left blocks are coded by single model LM or CCCM, the single model LM or CCCM candidates in the list can be moved to the head of the current list. Similarly, if GLM is used by neighbouring above or left blocks, the GLM related candidates in the list can be moved to the head of the current list.

Figure 12:
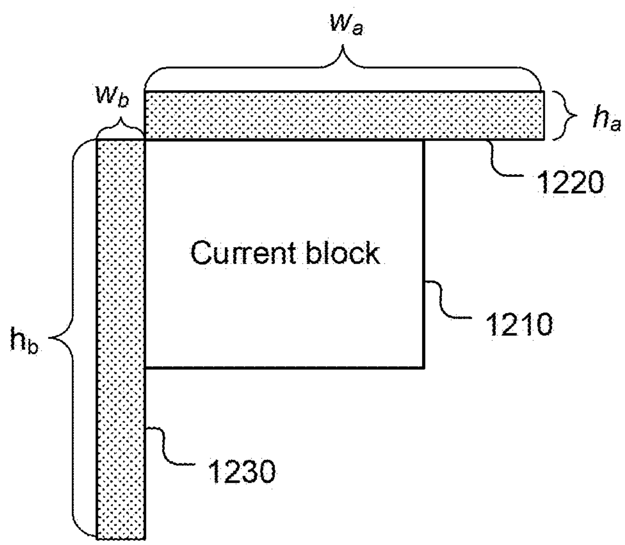
FIG. 12 illustrates an example of neighbouring templates for calculating model error.

In still another embodiment, the reordering rule is based on the model error by applying the candidate model to the neighbouring templates of the current block, and then compare the error with the reconstructed samples of the neighbouring template. For example, as shown in FIG. 12, the size of above neighbouring template of the current block is $w_a\times h_a$, and the size of left neighbouring template of the current block is $w_b\times h_b$. Suppose K models are in the current candidate list, and $\alpha_k$ and $\beta_k$ are the final scale and offset parameters after inheriting the candidate k. The model error of candidate k corresponding to the above neighbouring template is:

$$e_a^k=\sum_{i,j}\left|\left(\alpha_k\times recL_a'^{(i,j)}+\beta_k\right)-recC_a^{(i,j)}\right|$$

where, $$recL_a'^{(i,j)} \text{ and } recC_a^{(i,j)}$$

are the reconstructed samples of luma (e.g., after downsampling process or after applying GLM pattern) and reconstructed samples of chroma at position (i, j) in the above template, and $0\le i<w_a$ and $0\le j<h_a$.

Similarly, the model error of candidate k by the left neighbouring template is:

$$e_b^k=\sum_{m,n}\left|\left(\alpha_k\times recL_b'^{(m,n)}+\beta_k\right)-recC_b^{(m,n)}\right|$$

where $$recL_b'^{(m,n)} \text{ and } recC_b^{(m,n)}$$

are the reconstructed samples of luma (e.g., after applying downsampling process or GLM pattern) and reconstructed samples of chroma at position (m, n) in the left template, and $0\le m<w_b$ and $0\le n<h_b$.

Then the model error of candidate k is:

$$e^k=e_a^k+e_b^k$$

After calculating the model error among all candidates, it can get a model error list $E=\{e^0, e^1, e^2, \ldots, e^k, \ldots, e^K\}$. Then, it can reorder the candidate index in the inherited candidate list by sorting the model error list in ascending order.

In still another embodiment, if the candidate k uses CCCM prediction, the $$e_a^k \text{ and } e_b^k$$

are defined as:

$$e_a^k=\sum_{i,j}\left|\left(c0_k\times recL_a'^{(i,j)}+c1_k\times recL_a'^{(i,j-1)}+c2_k\times recL_a'^{(i,j+1)}+c3_k\times recL_a'^{(i-1,j)}+c4_k\times recL_a'^{(i+1,j)}+c5_k\times P+c6_k\times B\right)-recC_a^{(i,j)}\right|$$

$$e_b^k=\sum_{i,j}\left|\left(c0_k\times recL_b'^{(i,j)}+c1_k\times recL_b'^{(i,j-1)}+c2_k\times recL_b'^{(i,j+1)}+c3_k\times recL_b'^{(i-1,j)}+c4_k\times recL_b'^{(i+1,j)}+c5_k\times P+c6_k\times B\right)-recC_b^{(i,j)}\right|$$

where $c0_k$, $c1_k$, $c2_k$, $c3_k$, $c4_k$, $c5_k$, and $c6_k$ are the final filtering coefficients after inheriting the candidate k. P and B are the nonlinear term and bias term.

In still another embodiment, if the above neighbouring template is not available, then $$e^k = e_b^k.$$

Similarly, if the left neighbouring template is not available, then $$e^k = e_a^k.$$

If both templates are not available, the candidate index reordering method using model error is not applied.

In still another embodiment, not all positions inside the above and left neighbouring template are used in calculating model error. It can choose partial positions inside the above and left neighbouring template to calculate model error. For example, it can define a first start position and a first subsampling interval depends on the width of the current block to partially select positions inside the above neighbouring template. Similarly, it can define a second start position and a second subsampling interval depends on the height of the current block to partially select positions inside the left neighbouring template. For another example, $h_a$ or $w_b$ can be a constant value (e.g., $h_a$ or $w_b$ can be 1, 2, 3, 4, 5, or 6). For another example, $h_a$ or $w_b$ can be dependent on the block size. If the current block size is greater than or equal to a threshold, $h_a$ or $w_b$ is equal to a first value. Otherwise, $h_a$ or $w_b$ is equal to a second value.

Inheriting Candidates from the Candidates in the Candidate List of Neighbours

Figure 13:
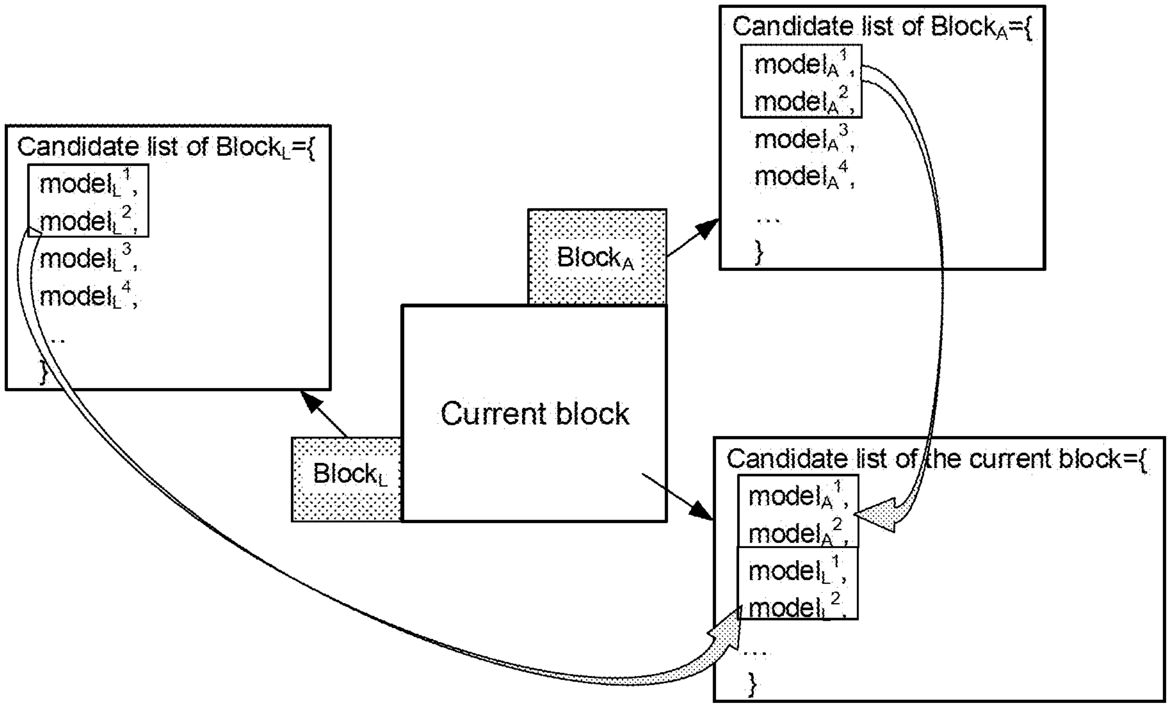
FIG. 13 illustrates an example of neighbouring templates for calculating model error.

The candidates in the current inherited candidate list can be from neighbouring blocks. For example, it can inherit the first k candidates in the inherited candidate list of the neighbouring blocks. As shown in the FIG. 13, the current block can inherit the first two candidates in the inherited candidate list of the above neighbouring block and the first two candidates in the inherited candidate list of the left neighbouring block. For an embodiment, after adding the neighbouring spatial candidates and non-adjacent spatial candidates, if the current inherited candidate list is not full, the candidates in the candidate list of neighbouring blocks are included into the current inherited candidate list. For another embodiment, when including the candidates in the candidate list of neighbouring blocks, the candidates in the candidate list of left neighbouring blocks are included before the candidates in the candidate list of above neighbouring blocks. For still another embodiment, when including the candidates in the candidate list of neighbouring blocks, the candidates in the candidate list of above neighbouring blocks are included before the candidates in the candidate list of left neighbouring blocks.

Signalling the Inherit Candidate Index in the List

An on/off flag can be signalled to indicate if the current block inherits the cross-component model parameters from neighbouring blocks or not. The flag can be signalled per CU/CB, per PU, per TU/TB, or per colour component, or per chroma colour component. A high level syntax can be signalled in SPS, PPS (Picture Parameter Set), PH (Picture header) or SH (Slice Header) to indicate if the proposed method is allowed for the current sequence, picture, or slice.

If the current block inherits the cross-component model parameters from neighbouring blocks, the inherit candidate index is signalled. The index can be signalled (e.g., signalled using truncate unary code, Exp-Golomb code, or fix length code) and shared among both the current Cb and Cr blocks. For another example, the index can be signalled per colour component. For example, one inherited index is signalled for Cb component, and another inherited index is signalled for Cr component. For another example, it can use chroma intra prediction syntax (e.g., IntraPredModeC[xCb][yCb]) to store the inherited index.

The syntax design of intra chroma modes becomes more and more complicated since there are many regression-based cross-component intra chroma coding tools, such as CCLM, CCCM or GLM, that have been proposed or are being addressed. In this disclosure, several syntax reorganization methods for regression-based cross-component chroma intra modes are presented to make the syntax design more efficient.

In one embodiment, a model derivation method flag is signalled for indicating whether the regression-based cross-component model for the current chroma intra predicted block is derived using its neighbouring reference samples or inherited from a merged cross-component model candidate list. In one embodiment, the merged cross-component model candidate list is derived from one or multiple historical cross-component model candidate lists. In one embodiment, the merged cross-component model candidate list is derived from the above and left neighbouring coded blocks, or non-adjacent neighbouring coded blocks. In one embodiment, the merged cross-component model candidate list comprises the models from historical cross-component model candidate list, spatial neighbouring earlier coded blocks and non-adjacent neighbouring coded blocks.

Syntax for Merged Cross-Component Model

In one embodiment, if the regression-based cross-component model is inherited from a merged cross-component model candidate list, a merge index can be further signalled for indicating which merge cross-component model candidate is used.

In one embodiment, after the merge candidate index, an explicit parameter adjustment flag can be further signalled for indicating whether one or more parameters in the selected candidate need to be explicitly adjusted or not, and then one or more syntaxes for indicating which parameter should be adjusted and the adjustment values can be signalled in bitstream.

In another embodiment, after the merge candidate index, an implicit parameter adjustment flag can be further signalled for indicating whether one or more parameters in the selected candidate need to be implicitly adjusted or not. In one embodiment, after the implicit parameter adjustment flag, one flag or index can be signalled for indicating which parameter should be adjusted. In one embodiment, after the implicit parameter adjustment flag, one flag or index can be signalled for indicating the region of neighbouring samples used for parameter refinement. For example, when the value of this index is equal to the first value, both the above reference samples and the left reference samples are used for refining one or more parameters. When the value of this index is equal to the second value, the above reference samples are used for refining one or more parameters. When the value of this index is equal to the third value, the left reference samples are used for refining one or more parameters.

Syntax for Derived Cross-Component Model

In one embodiment, if the regression-based cross-component model is derived from its neighbouring reference samples, some syntaxes can be further signalled after it to determine what kind of cross-component model is used for intra chroma prediction. These syntaxes can include, but are not limited to, some syntax shortcuts for strong modes, a multi-model syntax, a reference selection syntax, an additional model syntax and a parameter refinement syntax.

Syntax Shortcut

In one embodiment, a syntax shortcut can be signalled after model derivation method flag for some strong regression-based cross-component modes, such as CCLM_LT, MMLM_LT or CCCM. For example, a flag can be signalled for indicating whether CCLM_LT mode is used or not, or a flag can be signalled for indicating whether MMLM_LT mode is used or not, or a flag can be signalled for indicating single model CCCM using the above references and the left references is used or not. In one embodiment, for the remaining regression-based cross-component modes, a multi-model flag and/or reference selection flag can be signalled after this shortcut for indicating which cross-component model is selected.

Multi-Model Syntax

In one embodiment, a flag can be signalled for indicating whether single-model or multi-model is used to formulate the relation between luma reconstructed samples and chroma prediction samples. If the multi-model cross-component modes is selected, the samples will be divided into multiple groups according to some rules. For example, in one embodiment, the reconstructed luma value is smaller than a certain threshold will belong to the first group, and the reconstructed luma value is larger than a certain threshold will belong to the second group. In another embodiment, the position can be used for dividing samples into several groups. In one embodiment, this flag can be signalled after a model derivation method flag. In another embodiment, this flag can be signalled after a syntax shortcut of cross-component mode. In another embodiment, this flag can be signalled after a reference selection flag. In another embodiment, this flag can be signalled after an additional model flag. In another embodiment, this flag can be signalled after a parameter refinement flag.

In one embodiment, if multi-model is selected, a syntax can be further signalled for indicating how to separate the samples into multiple groups. For example, when the value of this syntax is equal to the first value, the samples can be separated into multiple groups according to the reconstructed luma value. When the value of this syntax is equal to the second value, the samples can be separated into multiple groups according to their position. In another example, when the value of this syntax is equal to the first value, the samples can be separated into multiple groups according to the reconstructed luma value with the first threshold set. When the value of this syntax is equal to the second value, the samples can be separated into multiple groups according to the reconstructed luma value with the second threshold set, and so on. In another example, when the value of this syntax is equal to the first value, the samples can be separated into multiple groups according to their position by the first predefined rule. When the value of this syntax is equal to the second value, the samples can be separated into multiple groups according to their position by the second predefined rule, and so on.

Reference Selection Syntax

In one embodiment, one flag or index can be signalled for indicating which reference samples are used to derive the parameters of cross-component model. For example, when the value of this index is equal to the first value, the above reference samples and the left reference samples are used to derive the parameters of the cross-component model. When the value of this index is equal to the second value, the above reference samples are used to derive the parameters of the cross-component model. When the value of this index is equal to the third value, the left reference samples are used to derive the parameters of the cross-component model. In another example, when the value of this index is equal to the first value, the reference samples in the nearest line around current block are used to derive the parameters of cross-component model. When the value of this index is equal to the second value, the reference samples in the second nearest line around current block are used to derive the parameters of cross-component model, and so on. In one embodiment, this flag or index can be signalled after a model derivation method flag. In another embodiment, this flag or index can be signalled after a syntax shortcut of cross-component mode. In another embodiment, this flag or index can be signalled after a multi-model flag. In another embodiment, this flag or index can be signalled after an additional model flag. In another embodiment, this flag or index can be signalled after a parameter refinement flag.

Additional Model Syntax

In one embodiment, the default cross-component model can be a simple linear model $y=ax+b$ or a 7-tap CCCM model, and an additional model flag can be signalled for indicating whether there are some valid additional variants of cross-component model. The variant can be using input from other domain or using more terms or different filter shapes in the cross-component model. In one embodiment, this flag can be signalled after a model derivation method flag. In another embodiment, this flag can be signalled after a syntax shortcut of cross-component mode. In another embodiment, this flag can be signalled after a multi-model flag. In another embodiment, this flag or index can be signalled after a reference selection flag. In another embodiment, this flag or index can be signalled after a parameter refinement flag.

In one embodiment, if there are some valid additional variants of cross-component model, one flag can be further signalled for indicating whether there are some inputs of cross-component model come from other domain or not. For example, the input can be the gradient domain data, or can be the Laplacian domain data. In one embodiment, not all inputs are from the other domain, so a syntax can be further signalled for indicating which inputs are from the other domain, and the remaining inputs are from spatial domain.

In one embodiment, if there are some valid additional variants of cross-component model, one flag or index can be further signalled for indicating the selected cross-component model. For example, the additional variants of cross-component model can have different number of filter taps, or the additional variants of cross-component model can have different filter shapes. For example, when the value of this index is equal to the first value, the first variant of cross-component model is used. When the value of this index is equal to the second value, the second variant of cross-component model is used, and so on.

Parameter Refinement Syntax

In one embodiment, a parameter refinement flag can be signalled for indicating whether the parameters of derived cross-component model need to be adjusted or not. In one embodiment, this flag can be signalled after a model derivation method flag. In another embodiment, this flag can be signalled after a syntax shortcut of cross-component mode. In another embodiment, this flag can be signalled after a multi-model flag. In another embodiment, this flag or index can be signalled after a reference selection flag. In another embodiment, this flag or index can be signalled after an additional model flag.

In one embodiment, if the derived cross-component model parameters need to be adjusted, a refinement index can be further signalled for indicating which parameter need to be refined, and the delta parameter adjustment value can be further signalled.

In another embodiment, the derived cross-component model parameters need to be adjusted and the parameter that need to be refined can be decided implicitly by a predefined rule. For example, only the parameter of bias term can be refined, or only the parameter of the centre term can be refined. Only the delta parameter adjustment value can be further signalled after the parameter refinement flag.

Figure 1A:
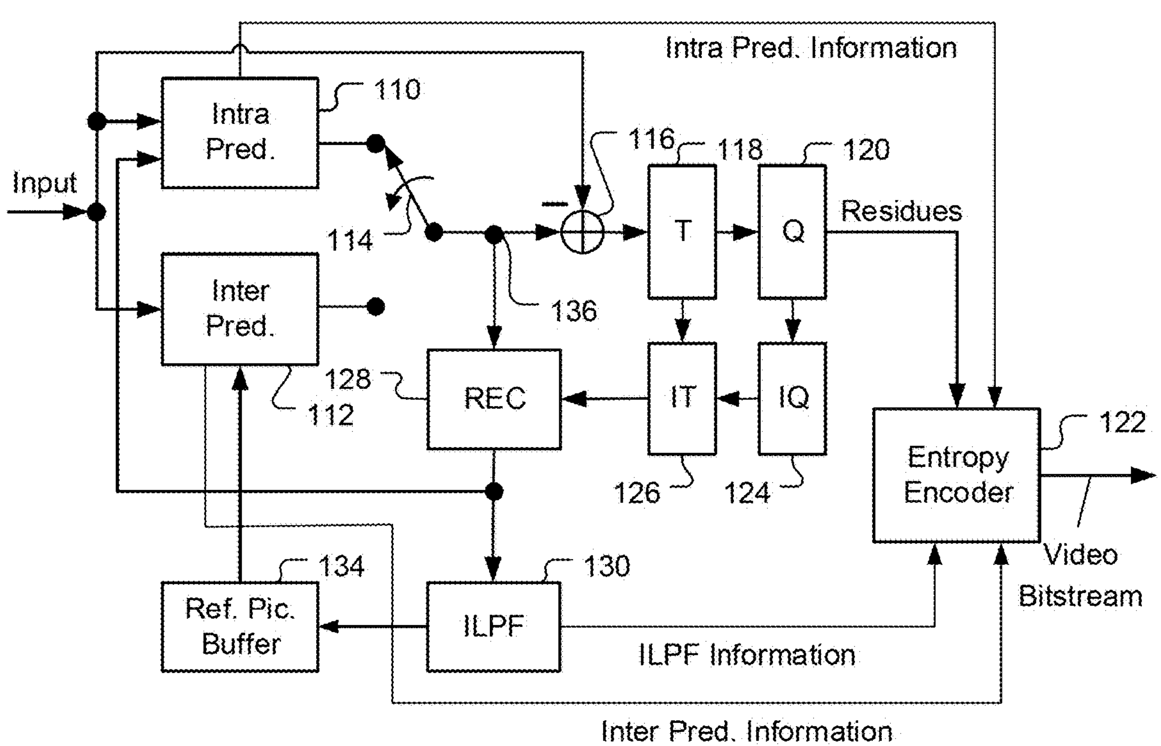
FIG. 1A illustrates an exemplary adaptive Inter/Intra video encoding system incorporating loop processing.
Figure 1B:
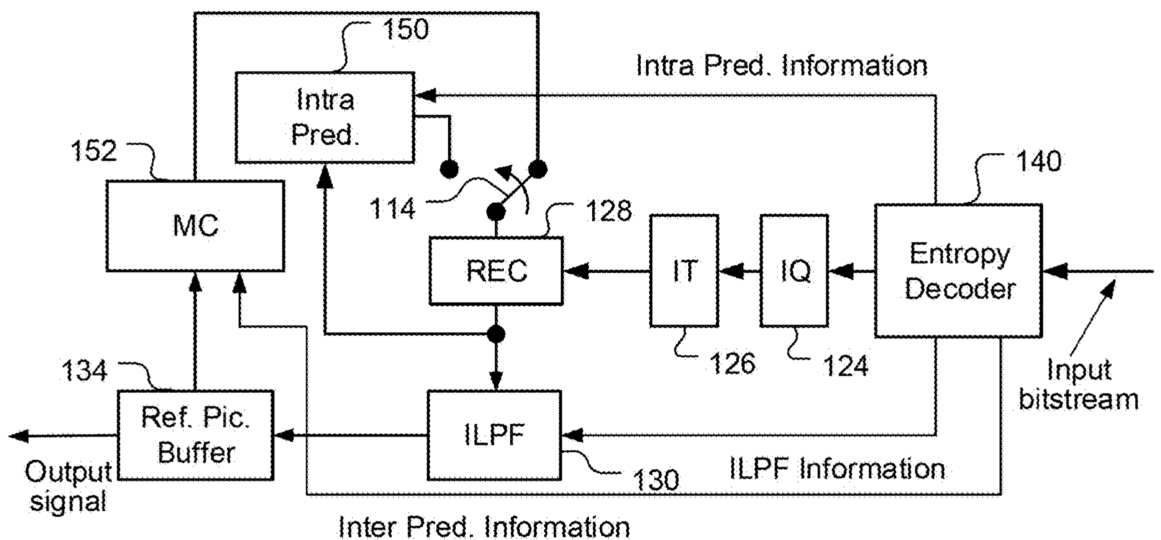
FIG. 1B illustrates a corresponding decoder for the encoder in FIG. 1A.

The cross component prediction with inherited model parameters as described above can be implemented in an encoder side or a decoder side. For example, any of the proposed cross component prediction methods can be implemented in an Intra/Inter coding module (e.g. Intra Pred. 150/MC 152 in FIG. 1B) in a decoder or an Intra/Inter coding module is an encoder (e.g. Intra Pred. 110/Inter Pred. 112 in FIG. 1A). Any of the proposed CCLM methods can also be implemented as a circuit coupled to the intra/inter coding module at the decoder or the encoder. However, the decoder or encoder may also use additional processing unit to implement the required CCLM processing. While the Intra Pred. units (e.g. unit 110/112 in FIG. 1A and unit 150/152 in FIG. 1B) are shown as individual processing units, they may correspond to executable software or firmware codes stored on a media, such as hard disk or flash memory, for a CPU (Central Processing Unit) or programmable devices (e.g. DSP (Digital Signal Processor) or FPGA (Field Programmable Gate Array)).

FIG. 14 illustrates a flowchart of an exemplary video coding system that incorporates inheriting model parameters for cross-component prediction according to an embodiment of the present invention. The steps shown in the flowchart may be implemented as program codes executable on one or more processors (e.g., one or more CPUs) at the encoder side. The steps shown in the flowchart may also be implemented based hardware such as one or more electronic devices or processors arranged to perform the steps in the flowchart. According to this method, input data associated with a current block comprising a first-colour block and one or more second-colour blocks are received in step 1410, wherein the input data comprise pixel data to be encoded at an encoder side or data associated with the current block to be decoded at a decoder side. A prediction candidate list comprising one or more inherited cross-component prediction candidates is determined in step 1420. A target model parameter set associated with a target inherited prediction model is derived based on an inherited model parameter set associated with the target inherited prediction model selected from the prediction candidate list in step 1430, wherein the target model parameter set comprises at least one re-derived or refined parameter being re-derived or refined from the inherited model parameter set, and wherein said at least one re-derived or refined parameter comprises a CCLM offset parameter when the target inherited prediction model corresponds to CCLM (Cross Component Linear Model), or two separate inherited model parameter sets are used for one of said one or more second-colour blocks. At least one of said one or more second-colour blocks is encoded or decoded using prediction data comprising cross-colour prediction generated by applying the target inherited prediction model with the target model parameter set to reconstructed first-colour block in step 1440.

FIG. 15 illustrates a flowchart of another exemplary video coding system that incorporates inheriting model parameters for cross-component prediction according to an embodiment of the present invention. According to this method, input data associated with a current block comprising a first-colour block and one or more second-colour blocks are received in step 1510, wherein the input data comprise pixel data to be encoded at an encoder side or data associated with the current block to be decoded at a decoder side. A prediction candidate list comprising one or more inherited cross-component prediction candidates is determined in step 1520. One or more target model parameter sets associated with a target inherited prediction model are derived based on one or more inherited model parameter sets associated with the target inherited prediction model selected from the prediction candidate list in step 1530, wherein when the target inherited prediction model corresponds to GLM (Gradient Linear Model), one or more gradient patterns associated with the GLM are also inherited, or when the target inherited prediction model corresponds to MMLM (Multiple Model CCLM Mode) or CCCM (Convolutional Cross-Component Model) with multi-model, a classification threshold associated with the MMLM or the CCCM with multi-mode is also inherited. At least one of said one or more second-colour blocks is encoded or decoded using prediction data comprising cross-colour prediction generated by applying the target inherited prediction model with said one or more target model parameter sets to reconstructed first-colour block in step 1540.

Figure 16:
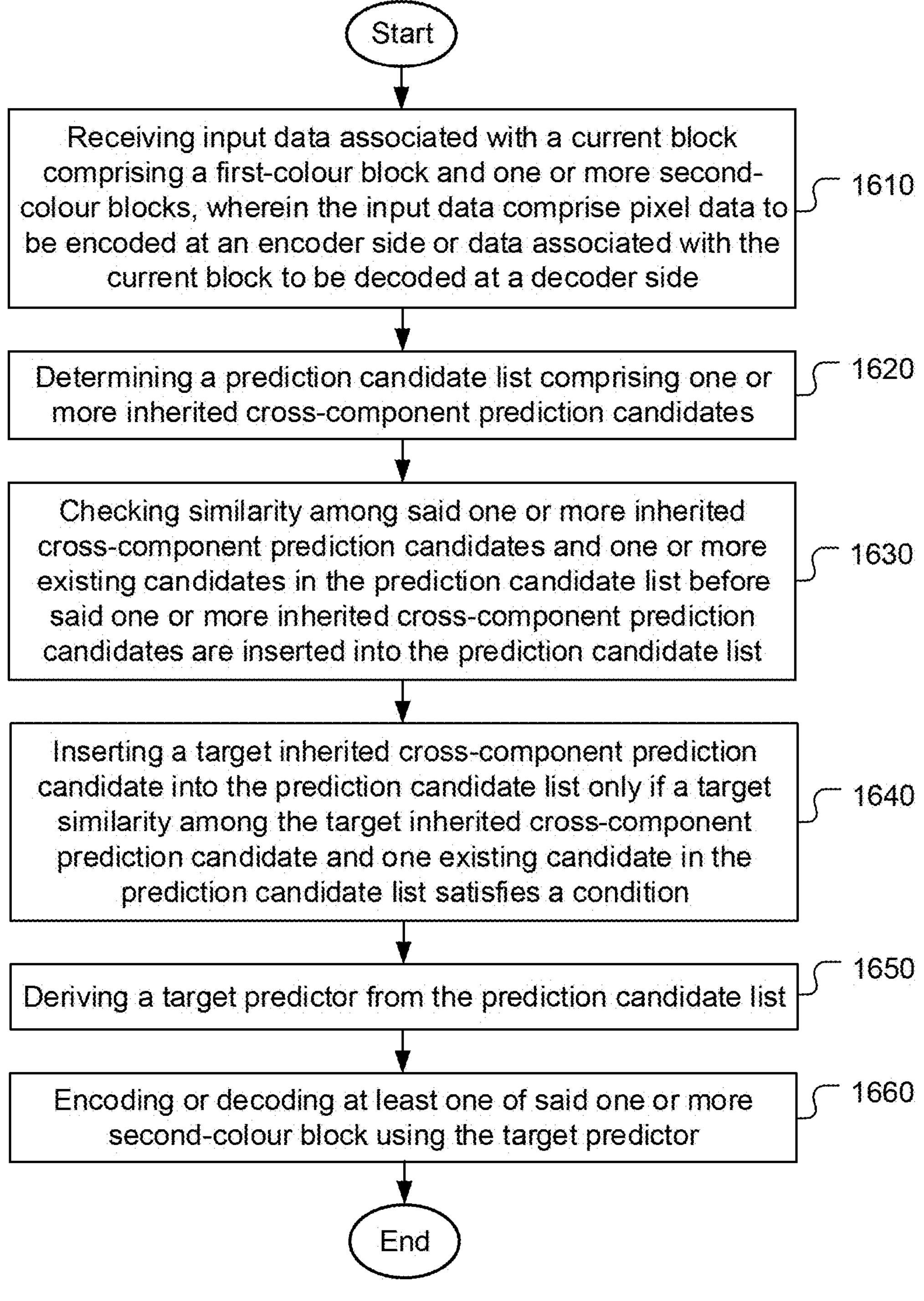
FIG. 16 illustrates a flowchart of yet another exemplary video coding system that incorporates inheriting model parameters for cross-component prediction according to an embodiment of the present invention.

FIG. 16 illustrates a flowchart of yet another exemplary video coding system that incorporates inheriting model parameters for cross-component prediction according to an embodiment of the present invention. According to this method, input data associated with a current block comprising a first-colour block and one or more second-colour blocks are received in step 1610, wherein the input data comprise pixel data to be encoded at an encoder side or data associated with the current block to be decoded at a decoder side. A prediction candidate list comprising one or more inherited cross-component prediction candidates is determined in step 1620. Similarity among said one or more inherited cross-component prediction candidates and one or more existing candidates in the prediction candidate list are checked in step 1630 before said one or more inherited cross-component prediction candidates are inserted into the prediction candidate list. A target inherited cross-component prediction candidate is inserted into the prediction candidate list in step 1640 only if a target similarity among the target inherited cross-component prediction candidate and one existing candidate in the prediction candidate list satisfies a condition. A target predictor is derived from the prediction candidate list in step 1650. At least one of said one or more second-colour blocks is encoded or decoded using the target predictor in step 1660.

The flowcharts shown are intended to illustrate an example of video coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more circuit circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of coding colour pictures using coding tools including one or more cross component model related modes, the method comprising:

receiving input data associated with a current block comprising a first-colour block and one or more second-colour blocks, wherein the input data comprises pixel data to be encoded at an encoder side or data associated with the current block to be decoded at a decoder side;

determining a prediction candidate list comprising one or more inherited cross-component prediction candidates;

deriving one or more target model parameter sets associated with a target inherited prediction model based on one or more inherited model parameter sets associated with the target inherited prediction model selected from the prediction candidate list, wherein when the target inherited prediction model corresponds to GLM (Gradient Linear Model), one or more gradient patterns associated with the GLM are also inherited, or when the target inherited prediction model corresponds to MMLM (Multiple Model CCLM Mode) or CCCM (Convolutional Cross-Component Model) with multi-model, a classification threshold associated with the MMLM or the CCCM with multi-mode is also inherited; and encoding or decoding at least one of said one or more second-colour blocks using prediction data comprising cross-colour prediction generated by applying the target inherited prediction model with said one or more target model parameter sets to reconstructed first-colour block.

2. The method of claim 1, wherein when the target inherited prediction model corresponds to the MMLM or the CCCM with multi-model, the classification threshold is used to classify neighbouring samples of the current block into multiple groups.

3. The method of claim 2, wherein one inherited model parameter set is assigned to each of the multiple groups.

4. The method of claim 3, wherein an offset parameter of each group is re-derived based on an inherited scaling parameter and an average value of neighbouring first-colour and second-colour samples of each group of the current block.

5. A method of coding colour pictures using coding tools including one or more cross component models related modes, the method comprising:

receiving input data associated with a current block comprising a first-colour block and one or more second-colour blocks, wherein the input data comprise pixel data to be encoded at an encoder side or data associated with the current block to be decoded at a decoder side;

deriving a prediction candidate list comprising one or more inherited cross-component prediction candidates;

checking similarity among said one or more inherited cross-component prediction candidates and one or more existing candidates in the prediction candidate list before said one or more inherited cross-component prediction candidates are inserted into the prediction candidate list;

inserting a target inherited cross-component prediction candidate into the prediction candidate list only if a target similarity among the target inherited cross-component prediction candidate and one existing candidate in the prediction candidate list satisfies a condition;

deriving a target predictor from the prediction candidate list; and encoding or decoding at least one of said one or more second-colour blocks using the target predictor.

6. The method of claim 5, wherein the condition corresponds to the similarity being larger than a threshold.

7. The method of claim 6, wherein the similarity is measured by comparing model parameters of two inherited cross-component prediction candidates.

8. The method of claim 7, wherein the target inherited cross-component prediction candidate is not inserted into the prediction candidate list if the model parameters of the target inherited cross-component prediction candidate is the same as the model parameters of another inherited cross-component prediction candidate.

9. An apparatus for video coding, the apparatus comprising one or more electronics or processors arranged to:

receive input data associated with a current block comprising a first-colour block and one or more second-colour blocks, wherein the input data comprise pixel data to be encoded at an encoder side or data associated with the current block to be decoded at a decoder side;

determine a prediction candidate list comprising one or more inherited cross-component prediction candidates;

derive one or more target model parameter sets associated with a target inherited prediction model based on one or more inherited model parameter sets associated with the target inherited prediction model selected from the prediction candidate list, wherein when the target inherited prediction model corresponds to GLM (Gradient Linear Model), one or more gradient patterns associated with the GLM are also inherited, or when the target inherited prediction model corresponds to MMLM (Multiple Model CCLM Mode) or CCCM (Convolutional Cross-Component Model) with multi-model, a classification threshold associated with the MMLM or the CCCM with multi-mode is also inherited; and encode or decode at least one of said one or more second-colour blocks using prediction data comprising cross-colour prediction generated by applying the target inherited prediction model with said one or more target model parameter sets to reconstructed first-colour block.

10. An apparatus for video coding, the apparatus comprising one or more electronics or processors arranged to:

receive input data associated with a current block comprising a first-colour block and a second-colour block, wherein the input data comprise pixel data to be encoded at an encoder side or coded data associated with the current block to be decoded at a decoder side;

derive a prediction candidate list comprising one or more inherited cross-component prediction candidates;

check similarity among said one or more inherited cross-component prediction candidates and one or more existing candidates in the prediction candidate list before said one or more inherited cross-component prediction candidates are inserted into the prediction candidate list;

insert a target inherited cross-component prediction candidate into the prediction candidate list only if a target similarity among the target inherited cross-component prediction candidate and one existing candidate in the prediction candidate list satisfies a condition;

derive a target predictor from the prediction candidate list; and encode or decode at least one of said second-colour blocks using the target predictor.

* * * * *